US010972418B2

(12) United States Patent
Crowe et al.

(10) Patent No.: US 10,972,418 B2
(45) Date of Patent: Apr. 6, 2021

(54) SYSTEMS AND METHODS FOR DYNAMICALLY ASSOCIATING THREAD LABELS WITH MESSAGES IN A MOBILE ENVIRONMENT

(71) Applicant: Thready, Inc., Santa Monica, CA (US)

(72) Inventors: Sean Crowe, Santa Monica, CA (US); Ovidiu Porfire, Santa Monica, CA (US)

(73) Assignee: THREADY, INC., Santa Monica, CA (US)

( * ) Notice: Subject to any disclaimer, the term of this patent is extended or adjusted under 35 U.S.C. 154(b) by 0 days.

(21) Appl. No.: 16/269,523

(22) Filed: Feb. 6, 2019

(65) Prior Publication Data
US 2019/0245821 A1  Aug. 8, 2019

Related U.S. Application Data

(60) Provisional application No. 62/627,720, filed on Feb. 7, 2018.

(51) Int. Cl.
H04L 12/58 (2006.01)
H04W 4/12 (2009.01)

(52) U.S. Cl.
CPC ............. H04L 51/16 (2013.01); H04W 4/12 (2013.01); H04L 51/22 (2013.01)

(58) Field of Classification Search
CPC ..................................................... H04L 51/16
See application file for complete search history.

(56) References Cited

U.S. PATENT DOCUMENTS

| | | | | |
|---|---|---|---|---|
| 2003/0212746 | A1* | 11/2003 | Fitzpatrick | H04L 12/1827 709/206 |
| 2005/0235034 | A1* | 10/2005 | Chen | H04L 12/1831 709/206 |
| 2008/0109406 | A1* | 5/2008 | Krishnasamy | G06Q 10/107 |
| 2010/0217808 | A1* | 8/2010 | Benninger | H04L 51/04 709/206 |
| 2014/0324984 | A1* | 10/2014 | Chang | H04L 51/32 709/206 |
| 2016/0364368 | A1* | 12/2016 | Chen | H04L 51/16 |
| 2017/0091208 | A1* | 3/2017 | Quan | G06F 3/0482 |
| 2018/0359353 | A1* | 12/2018 | Vlandis | H04L 51/22 |

OTHER PUBLICATIONS

Lori Kaufman, "Inbox Management and Labels," Jun. 16, 2014. (Year: 2014).*

* cited by examiner

Primary Examiner — Andrew C Georgandellis
(74) Attorney, Agent, or Firm — Sheppard, Mullin, Richter & Hampton LLP

(57) ABSTRACT

Systems and methods are provided for associating thread labels with select messages in a mobile messaging conversation environment, either before or after the messages have been sent, and providing intelligent dynamic presentations of such select messages based on the thread label(s) associated therewith.

15 Claims, 24 Drawing Sheets

SYSTEMS AND METHODS FOR DYNAMICALLY ASSOCIATING THREAD LABELS WITH MESSAGES IN A MOBILE ENVIRONMENT

CROSS REFERENCE TO RELATED APPLICATION

This application claims priority to U.S. Provisional Application No. 62/627,720, filed Feb. 7, 2018, the disclosure of which is incorporated herein.

TECHNICAL FIELD

The disclosed technology relates generally to messaging systems, and some embodiments relate more particularly to systems and methods for dynamically associating thread labels to messages within a conversation (either before or after the messages have been sent), and/or providing optional filtered presentations of such select messages based on the thread label(s) associated with such messages.

DESCRIPTION OF THE RELATED ART

Mobile messaging systems are commonplace in today's society. Text messaging, in particular, is widespread. Mobile messaging provides a quick and easy mechanism to send information to others over a cellular network, Internet network, or other network. For example, mobile messaging systems may allow users to send messages containing text, photos, videos, graphics, and other multimedia to one another, and thereby enable users to have conversations and share information and memories with one another. Some of the messages sent between or among users may relate to one topic, while other messages may relate to another topic, and still further messages might relate to multiple topics. Topics to which messages relate may include events, family, work, friends, appointments, current events, common interests, hobbies, etc. Regardless of the topic, however, all such messages are provided in a single conversation feed between users in mobile environments. No mobile messaging system provides native threading tools to enable a user to dynamically (before or after transmission of a message) associate or disassociate the message with a thread label within a mobile messaging conversation, view a subset of messages from a conversation based on the given thread label dynamically associated with the subset of messages, organize messages based on their dynamic association with a given thread label, coordinate/propagate such dynamic thread label associations to computing devices of relevant parties to a given messaging conversation, and/or search messages based on dynamically associated thread labels associated therewith. Instead, current mobile messaging systems only allow a user to search for one or more words throughout an entire conversation history. In particular, no mobile messaging system currently enables post-transmission association of a thread label with a message.

This lack of ability to dynamically associate/disassociate/re-associate messages with thread labels, and correspondingly view, organize, coordinate, propagate, and search such messages can lead to wasted time and effort trying to find particular messages about a topic or view all messages about a topic. This can be particularly problematic when a given set of users has an extensive conversation history—such as conversations between family members or long-term friends who often send mobile messages to one another using the same phone numbers for years at a time. Indeed, some users may maintain a single conversation feed amongst themselves for 10 or more years, thus making it difficult to search for a particular message sent long ago (e.g., 8 years ago) or view the history of a conversation about a particular topic. Further, in mobile messaging conversations, users often discuss multiple topics at the same time and may send a message about one topic, then a second message about a second topic, then a third message about a third topic and then a fourth message about the first topic, making it difficult for a recipient of those messages to tell which messages relate to which topics. When a recipient replies to those messages, it gets even more difficult for the other participants to the conversation to determine which messages relate to which topics. Accordingly, systems and methods providing solutions to these issues are provided by the instant disclosure.

SUMMARY OF THE EMBODIMENTS

In accordance with various embodiments of the present disclosure, an example system may include: one or more processors; a memory storing instructions that, when executed by the one or more processors, cause the system to: provide a first messaging interface for electronic messaging; generate, responsive to a user selection, one or more thread labels corresponding to one or more topics; associate, responsive to a user selection from within the first messaging interface, one or more of the generated thread labels with a message; provide a second messaging interface for electronic messaging corresponding to one of the thread labels; wherein the first messaging interface is configured to display a conversation feed including one or more of: a collection of one or more messages not associated with one or more thread labels, and a collection of one or more messages associated with one or more thread labels; and wherein the second messaging interface is configured to display a conversation feed including only a collection of one or more messages associated with one of the thread labels corresponding to the second messaging interface.

In some embodiments of the present disclosure, systems of the present disclosure may further store instructions that, when executed by the one or more processors, cause the system to: provide, within the first messaging interface, one or more selectable display objects associated with the one or more thread labels; and/or navigate, responsive to a user selection of a selectable display object associated with one of the thread labels corresponding to the second messaging interface, from the first messaging interface to the second messaging interface; and/or arrange, within the first messaging interface, a display of the one or more selectable display objects based on a number of unread messages having a thread label associated with the one or more selectable display objects; and/or disassociate, responsive to a user selection from within the first messaging interface, one or more previously associated thread labels from the message; and/or disassociate, responsive to a user selection from within the second messaging interface, one or more previously associated thread labels from the message; and/or add, responsive to an association of one or more of the generated thread labels with a message containing one or more of an image, a video and a GIF, the one or more of the image, the video and the GIF into a thread label associated album, wherein the thread label album corresponds to a collection of images, videos and GIFs contained within messages associated with a thread label; and/or remove, responsive to a disassociation of one or more of the generated thread labels from a message containing one or more of an image, a video and a GIF, the one or more of the image, the video and the GIF from the thread label associated album.

In some embodiments, systems of the present disclosure may further store instructions that, when executed by the one or more processors, cause the system to: associate or disassociate, responsive to a user selection from within an interface of the present disclosure, a thread label with a message at any time before or after a message has been transmitted.

In some embodiments of the present disclosure, the one or more selectable display objects may include thumbnails comprising imagery associated with the corresponding one or more thread labels. And in some instances, the thumbnail imagery of the one or more selectable display objects may be modified by a user.

In accordance with various embodiments of the present disclosure, an example method may involve: providing a first messaging interface for electronic messaging; generating, responsive to a user selection, one or more thread labels corresponding to one or more topics; associating, responsive to a user selection from within the first messaging interface, one or more of the generated thread labels with a message; and/or providing a second messaging interface for electronic messaging corresponding to one of the thread labels; wherein the first messaging interface is configured to display a conversation feed including one or more of: a collection of one or more messages not associated with one or more thread labels, and a collection of one or more messages associated with one or more thread labels; and wherein the second messaging interface is configured to display a conversation feed including only a collection of one or more messages associated with one of the thread labels corresponding to the second messaging interface.

In some embodiments of the present disclosure, methods of the present disclosure may involve: providing, within the first messaging interface, one or more selectable display objects associated with the one or more thread labels; and/or navigating, responsive to a user selection of a selectable display object associated with one of the thread labels corresponding to the second messaging interface, from the first messaging interface to the second messaging interface; and/or arranging, within the first messaging interface, a display of the one or more selectable display objects based on a number of unread messages having a thread label associated with the one or more selectable display objects; and/or disassociating, responsive to a user selection from within the first messaging interface, one or more previously associated thread labels from the message; and/or disassociating, responsive to a user selection from within the second messaging interface, one or more previously associated thread labels from the message; and/or adding, responsive to an association of one or more of the generated thread labels with an electronic message containing one or more of an image, a video and a GIF (or any other form of multimedia as may exist from time to time) that users may send to each other through electronic messaging), the one or more of the image, the video and the GIF into a thread label associated album, wherein the thread label album corresponds to a collection of images, videos and GIFs contained within messages associated with a thread label; and/or removing, responsive to a disassociation of one or more of the generated thread labels from a message containing one or more of an image, a video and a GIF, the one or more of the image, the video and the GIF from the thread label associated album.

In some embodiments, methods of the present disclosure may further involve: associating or disassociating, responsive to a user selection from within an interface of the present disclosure, a thread label with a message at any time before or after a message has been transmitted.

In some embodiments of the present disclosure, the one or more selectable display objects may include thumbnails comprising imagery associated with the corresponding one or more thread labels. And in some instances, the thumbnail imagery of the one or more selectable display objects may be modified by a user.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward advanced messaging systems, and some embodiments relate more particularly to systems and methods for dynamically associating thread labels to messages within a mobile messaging environment, either before or after the messages have been transmitted within a conversation, and/or providing a filtered presentation of select messages based on the thread label(s) associated with such messages.

Figure 1:
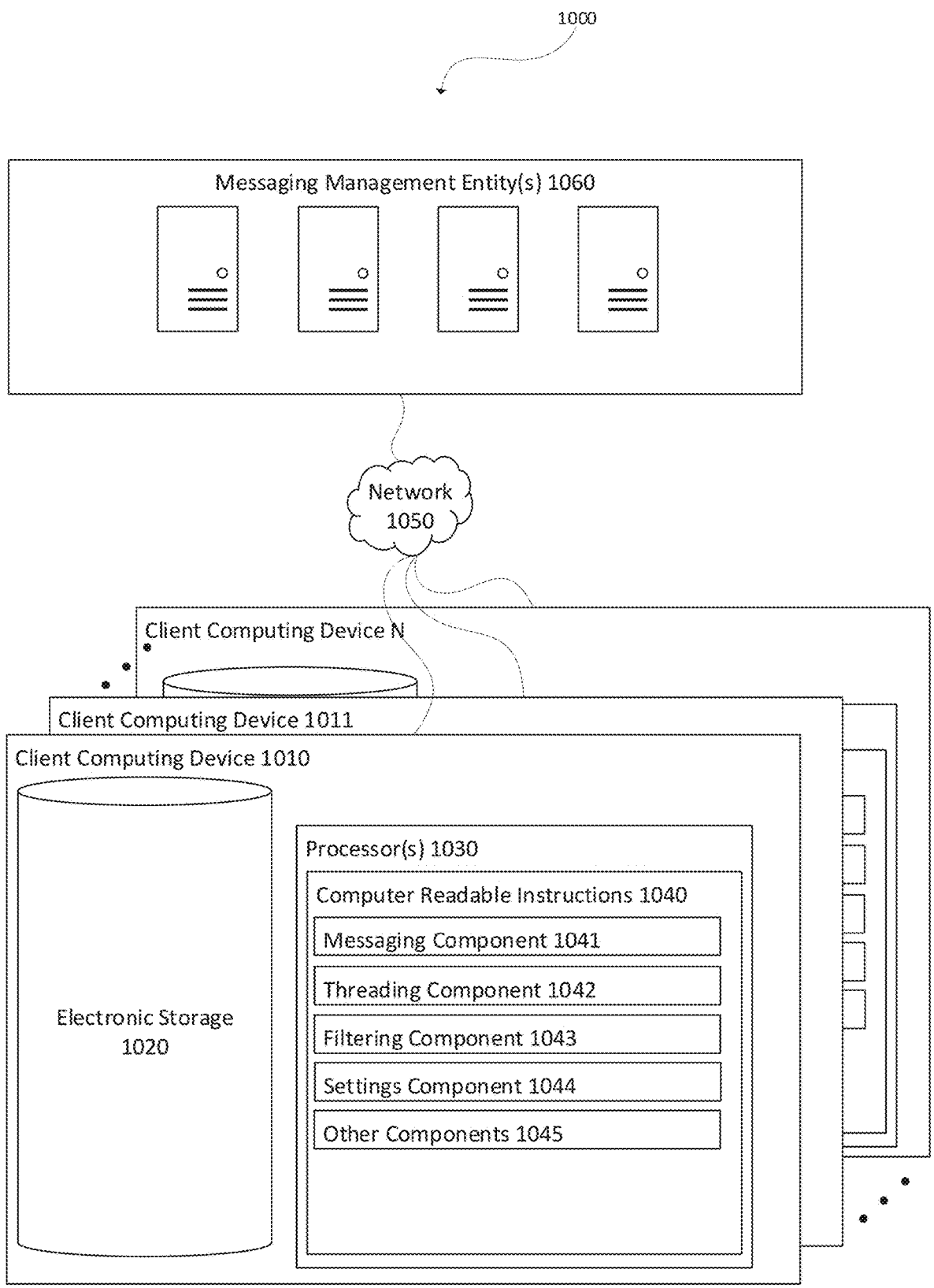
FIG. 1 is a block diagram illustrating an example system in accordance with one or more embodiments of the present disclosure.

FIG. 1 is a block diagram illustrating an example system in accordance with one or more embodiments of the present disclosure. As shown, a system 1000 of the present disclosure may include a plurality of client computing devices (e.g., client computing device 1010, client computing device 1011, client computing device N) communicatively coupled with one another over network 1050. The plurality of client computing devices may further be communicatively coupled with a messaging management entity 1060 over network 1050.

As shown in FIG. 1, a client computing device (e.g., a smartphone) such as client computing device 1010 may include an electronic storage 1020 configured to store electronic data such that the data may be retrieved, recalled, or otherwise accessible to other components of client computing device 1010, and/or to messaging management entity 1060 with which client computing device 1010 is communicatively coupled. As shown, client computing device 1010 may include one or more processing engines such as processor(s) 1030 configured to effectuate one or more features of the presently disclosed technology upon execution of the one or more computer readable instructions 1040 accessible thereto. In some embodiments, the hardware and/or computer readable instructions 1040 of client computing device 1010 may comprise a messaging component 1041, a threading component 1042, a filtering component 1043, and a settings component 1044, among other components 1045.

Messaging component 1041 may be configured to provide a user with an interactive view of: one or more filtered or unfiltered conversations the user may be involved in with one or more other users, and/or one or more messaging tools the user may operate to compose or otherwise prepare a message to be sent and included within one or more conversations with one or more other users. An unfiltered conversation with a particular user or group of users may be viewed in the conversation pane of what is sometimes referred to herein as a primary messaging interface, while filtered conversations (explained in more detail herein) with a particular user or group of users may be viewed in the conversation pane of what is sometimes referred to herein as a secondary messaging interface or a filtered conversation interface. As will be explained in more detail herein, an unfiltered view of a conversation with a particular user or group of users may include all the messages transmitted back-and-forth between such users, regardless of the thread label(s) (if any) associated with any one or more such messages; and a filtered view of a conversation with a particular user or group of users may include less than all messages transmitted back-and-forth between such users, where one or more messages not associated with a designated thread label are filtered out of the view such that the application interface displays only those messages associated with the designated thread label.

In some alternative embodiments, messaging component 1041 may also be configured to provide a user with a modified primary messaging interface (e.g., which may be optionally selectable), where the modified primary messaging interface provides a quasi-unfiltered view of the messages within a conversation instead of an entirely unfiltered view of the messages within a conversation with one or more users. A quasi-unfiltered view of a conversation with a particular user or group of users may include messages transmitted back-and-forth between the users that have not been associated with a thread label, but excludes the messages that have been associated with a thread label. Quasi-unfiltered refers to the idea that the messages shown in the feed are not filtered in favor of a particular thread label, but instead are filtered to show only those messages with no thread label at all. An example of an optional modified primary messaging interface will be illustrated and explained in particular with reference to FIGS. 4A-B.

Threading component 1042 may be configured to provide one or more electronic threading tools to a user via a messaging interface (e.g., a primary messaging interface, a modified primary messaging interface, a secondary messaging interface, etc.), the one or more threading tools enabling a user to selectively define a new thread label, view and/or select a thread label from among one or more previously defined thread labels, associate or disassociate a thread label with a message, and/or define or modify one or more settings associated with the one or more threading tools or conversations occurring within system 1000.

In some embodiments, threading tools may be made available to a user via icons displayed on a graphical user interface presented as part of a mobile application. In such embodiments, for example, upon selection of an icon associated with defining a new thread label, the user may be taken to a thread creation interface (i.e., the app may navigate to a thread creation screen) with which the user may interact to define a new thread label, and/or edit one or more parameters associated with a previously created thread label, in which case, any newly created thread labels or edits to previously created thread labels will be reflected on the device of each participant to the conversation.

In some embodiments, upon selection of an icon associated with defining a new thread label, the user is not taken to a thread creation interface separate from the primary messaging interface; rather, the user is presented with a thread bar within the primary messaging interface (discussed below), the thread bar allowing the user to create a thread label within the primary messaging interface itself without navigating away from the conversation. In some such embodiments, the user may not be able to define one or more of the parameters associated with the thread label within the primary messaging interface that the user would otherwise be able to define within the thread creation interface.

In some embodiments, associating or disassociating a thread label with a message may occur before or after a message has been transmitted over the network (i.e., sent to another client computing device and/or the messaging management entity 1060). Similarly, in some embodiments, defining or modifying one or more settings associated with one or more threading tools (discussed below) may occur before or after a message has been sent. In some embodiments, such settings or modifications to such settings may only apply to future messaging interactions. In other embodiments, such settings or modifications to such settings may retroactively apply to previously sent messages in one or more conversations.

Filtering component 1043 may be configured to provide one or more filtering tools to the user within the interactive view of a messaging interface (e.g., via a graphical user interface of a mobile application running on the user's client computing device). The one or more filtering tools may be accessible to a user via one or more icons presented within the interactive view of a messaging interface. Responsive to a user's selection of one or more such icons, the user may be taken to a filtering interface whereupon the user may filter the view of a conversation with a user or group of users by one or more of the thread labels used within the overall conversation with such user or group of users. Filtering component 1043 may further be configured to provide a search field to a user to enable such user to search for certain text (e.g., a certain word or certain phrase) within a conversation or within the name of a thread label. Upon the occurrence of such a text search, filtering component 1043 may present a limited view of the thread labels used within the conversation, the limited view showing only those thread labels associated with a message that contains the text the user entered as part of the user's search query and/or those thread labels with names that contain the text the user entered as part of the user's search query.

Settings component 1044 may be configured to provide a user with one or more settings tools, the settings tools enabling the user to provide input to set up an account or user profile, define notification preferences, edit account or contact information, and/or define one or more permissions that may be propagated or otherwise applied against one or more other users, groups of users, certain users within a group of users or thread labels.

It should be noted that a client computing device may be any type of computing device, including but not limited to a smartphone, a phone, a tablet, a desktop computer, a workstation, a computer, a laptop, and/or other device configured to send and receive messages over network 1050 to one or more other client computing devices and/or a messaging management entity 1060. Message management entity 1060 may be configured to monitor changes to any thread label associations in a given conversation, and further to propagate such changes to other participants within the given conversation. Message management entity 1060 may monitor any changes made by a user via his or her client computing device (e.g., any changes made by a user to a message, a group, a thread label, etc.), and such changes may be reflected on the devices of all users in the conversation (or all users remaining in a conversation). Message management entity 1060 may comprise one or more servers, processing engines, other computing resources communicatively coupled with one or more client computing devices over network 1050.

Having thus described an example messaging system with which one or more aspects of the disclosed technology can be implemented, various embodiments and examples are now described. Although the disclosed technology may be described from time to time herein in terms of this example messaging system, one of ordinary skill in the art reading this disclosure will understand how aspects of the disclosed technology can be implemented with different messaging systems. Various embodiments and examples of the presently disclosed technology (shown in FIGS. 2A-9) are provided to help show one or more of the features provided by system 1000, effectuated whole or in part by messaging management entity 1060, messaging component 1041, threading component 1042, filtering component 1043, settings component 1044, and/or other components 1045. As shown herein, some embodiments of the presently disclosed technology may be implemented, in whole or in part, as a mobile application running on a plurality of smartphones communicatively coupled to one another. Before discussing the various examples in further detail, however, it should be noted that although certain elements and components are often discussed herein with reference to computation resources local to client computing devices, it should be appreciated that any one or more of such elements and components may be located, distributed, and/or implemented in whole or in part at messaging management entity 1060 without departing from the scope of the present disclosure.

Figure 2A:
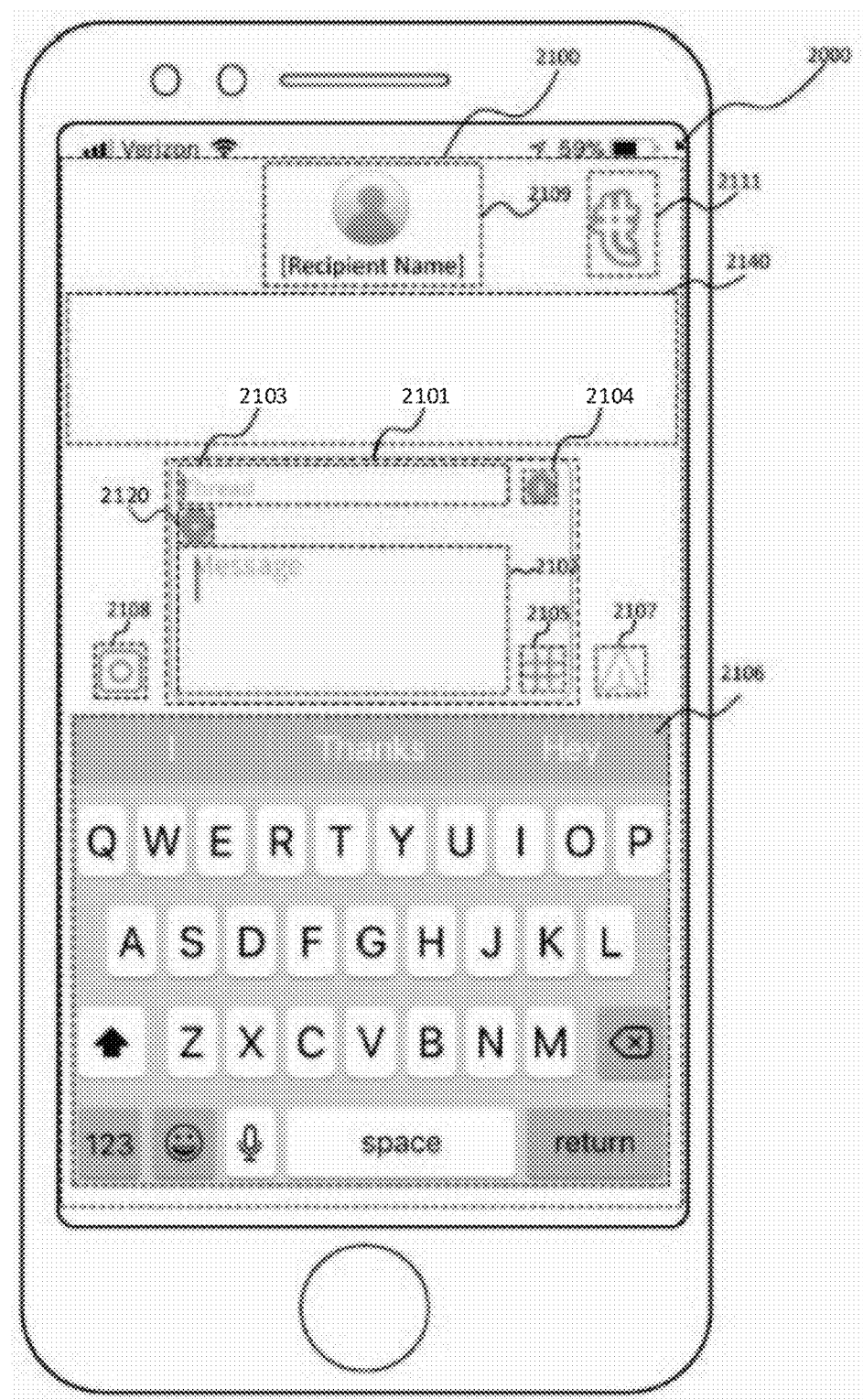
FIG. 2A illustrates an example primary messaging interface at client computing device (here, a mobile smartphone) before a thread label has been created, as may be implemented in accordance with one or more embodiments of the present disclosure.

FIG. 2A illustrates an example primary messaging interface 2100 shown within a Graphical User Interface (GUI) 2000 of a mobile application running on an example mobile computing device, as may be implemented in accordance with one or more embodiments of the present disclosure.

The primary messaging interface 2100 shown depicts an example primary messaging interface before any thread labels have been created or otherwise established—via operation of one or more of the aforementioned components—between the user of the example mobile computing device shown and the intended recipient. The primary messaging interface 2100 may include a message composition zone 2102 wherein a user may compose a message to one or more recipients by providing input through one or more input tools. Such input tools may include, by way of example, the QWERTY keyboard 2106 shown in FIG. 2A, the multimedia (e.g., photos, videos, GIFs, etc.) selection tool 2108 shown in FIG. 2A, the thread label creator 2120 shown in FIG. 2A, a voice note creation tool (not shown), a location sending tool (not shown), an audio file attachment tool (not shown), a send button 2107 shown in FIG. 2A, among other tools. It should be noted that the foregoing are merely examples of input tools that may be implemented in accordance with one or more embodiments of the present disclosure, and are not intended to be limiting. Variations and modifications of the foregoing may also be implemented without departing from the present disclosure. For example, QWERTY keyboard 2106 above may instead be arranged as an AZERTY keyboard, a QWERTZ keyboard, a HCESAR keyboard, and/or other keyboards. QWERTY keyboard 2106 may also be a smart keyboard that may suggest a word based on a user's input, auto-correct misspelled words, or allow users to use emojis, symbols, graphics, and/or other input.

Primary messaging interface 2100 may further include one or more threading tools (provided via threading component 1042 of system 1000) to enable a user to associate a thread label with a message. As will be discussed in more detail with respect to subsequent figures, such threading tools may include: (a) a thread bar 2103 to display thread labels that have been selected—automatically or manually—for association with a message (e.g., an outgoing message being composed); (b) one or more threading buttons (e.g., thread adder 2104 and thread label creator 2120) which provide users with (i) the ability to create a new thread label (either within the primary messaging interface, or through a different screen that can be navigated to through the primary messaging interface), (ii) the ability to select a previously created thread label, (iii) the ability to edit or delete a previously created thread label, and/or (iv) associate a thread label with a message (whether before, during, or after a message has been composed, sent or received). Examples of one or more implementations of the foregoing features are shown and described in more detail with respect to FIG. 2B—FIG. 2J.

Referring still to FIG. 2A, when a user initially enters primary messaging interface 2100, the portion of the interface constituting area 2101 may be configured such that thread bar 2103, thread label creator 2120, thread adder 2104, and/or thread bar 2123 (from FIGS. 2C and 2F) are not initially displayed. If a user were to tap on threading button 2105, then the portion constituting area 2101 may then display thread bar 2103, thread label creator 2120, thread adder 2104, and/or thread bar 2123. By tapping on threading button 2105 again, the portion constituting area 2101 may no longer display thread bar 2103, thread label creator 2120, thread adder 2104, and/or thread bar 2123. Any messages transmitted by a user when the portion constituting area 2101 does not display thread bar 2103, thread label creator 2120, thread adder 2104, and/or thread bar 2123 may be transmitted without being associated with any thread labels. Further, in some embodiments, thread bar 2103 may only appear after a thread label has been selected from the thread selector bar 2123.

Referring still to FIG. 2A, primary messaging interface 2100 may also include a conversation pane 2140 where messages that have already been transmitted between users in the conversation may appear. The conversation pane 2140 of primary messaging interface 2100 may display all or part of the entire conversation feed between or among parties to a conversation. In some embodiments, a user may scroll upward or downward within conversation pane 2140 to view more recent or older messages.

As further shown in FIG. 2A, primary messaging interface 2100 may include a recipient identifier 2109 which identifies one or more persons included in a given conversation. Recipient identifier 2109 may include any type of alphanumeric characters, graphics, and/or any symbolic identifiers as desired. FIG. 2A depicts an example default recipient identifier 2109 that merely includes a representative thumbnail where a photo or other graphic may be displayed in connection with a given recipient, as well as a textual description that may be displayed in connection with a given recipient (here, the recipient's name shown symbolically as "[Recipient Name]").

Primary messaging interface 2100 may also include thread label creator 2120 which, when selected by a user, may either (a) navigate the user to a different screen where the user could create a new thread label or (b) allow the user to create a new thread label from within the primary messaging interface 2100. Option (b) may not provide the user with all of the options available via the different screen (e.g., the add photo to create thumbnail feature, the thread description feature, etc.), but may at least provide the user with a mechanism to define the name of a new thread label without having to navigate away from the primary messaging interface 2100. Later, a user may navigate to a different screen to edit the thread label previously created via the thread selector bar. Thread label creator 2120 may be presented on GUI 2000 even though no thread labels have been created.

Once the user has created a thread label, the created thread label may appear in thread bar 2103, indicating to the user that any message sent while the given thread label is selected will be associated with the given thread label in the global conversation feed.

FIG. 2A also depicts a thread label viewing/filtering button ("TLVF" button) 2111 which, upon selection by a user, allows the user to navigate to one or more of: (a) a listing of previously created thread labels, and (b) a secondary messaging interface to allow the user to view only messages that have been associated with a particular thread label. In some embodiments, the user, upon selection of a TLVF button, is taken first to a listing of previously created thread labels, and then upon an additional selection of a given thread label from within the listing, is taken to the secondary messaging interface to allow the user to view only the messages that have been dynamically associated with the selected thread label. That is, the secondary messaging interface may provide a filtered view of a conversation between the user and a given recipient or group of recipients. The filtered view showing only those messages that have been associated with a particular thread label, and removing from view the messages within the conversation that are not associated with a particular thread label.

Figure 2B:
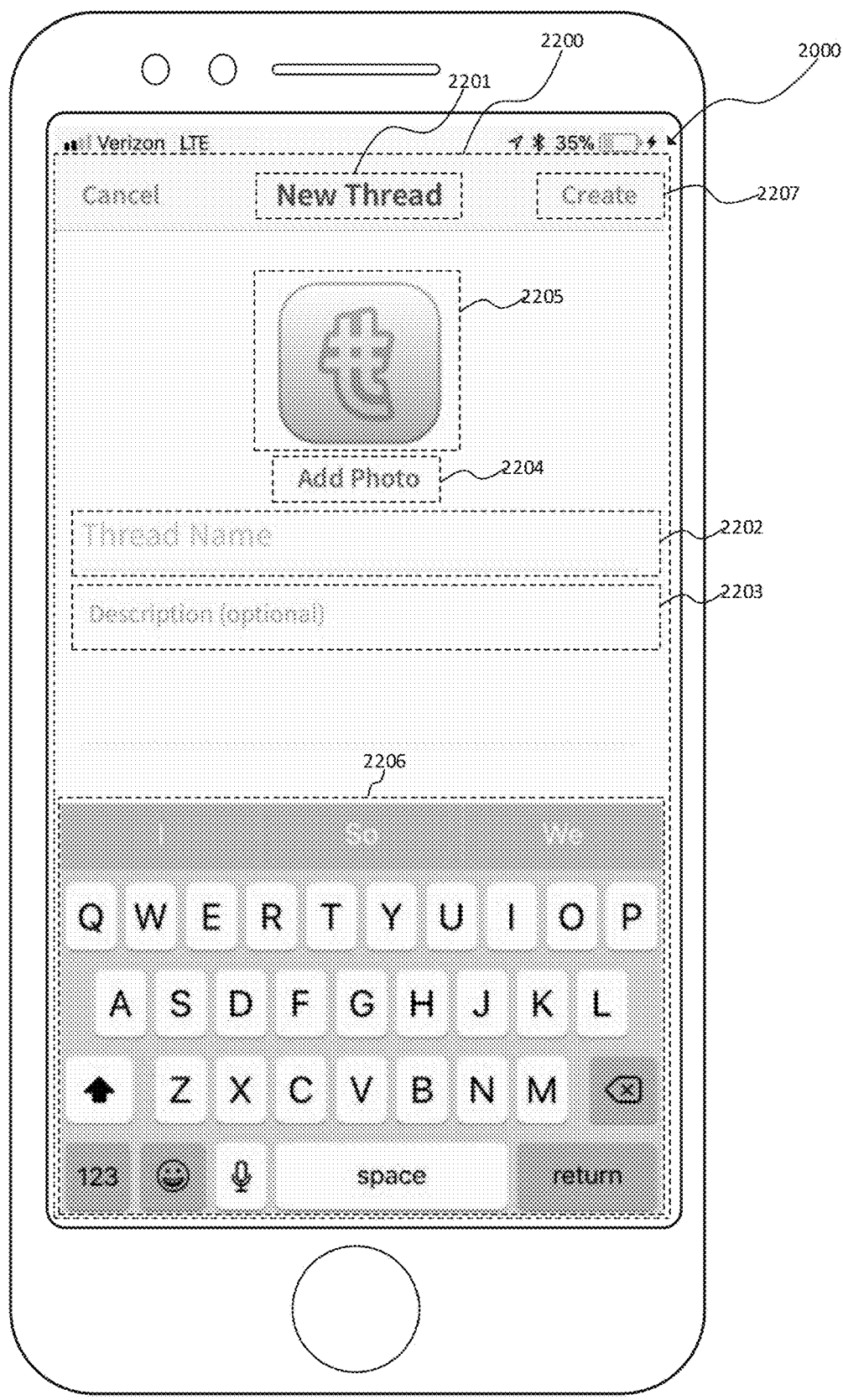
FIG. 2B illustrates an example thread creation interface as may be implemented in accordance with one or more embodiments of the present disclosure.

FIG. 2B illustrates an example thread label creation interface 2200 (provided via threading component 1042 of system 1000) as may be implemented in accordance with one or more embodiments of the present disclosure. Such an interface may also be referred to herein as the "New Thread" screen, as it has been labeled in FIG. 2B at numeral 2201. A user may navigate to the thread label creation interface 2200 (or "New Thread" screen) to provide input and create a new thread label that may be associated with one or more messages. As shown in FIG. 2B, thread label creation interface 2200 may include a thread name field 2202 where a user may enter the name of a thread label that he or she would like to create (for example, by providing input via QWERTY keyboard 2206). Thread label creation interface 2200 may also include a description field 2203 where a user may enter a description of the thread label as desired. In some instances, a user may provide a description of the thread label to assist other participants in the conversation in determining which of their messages that they send in that conversation should or should not also be associated with the same thread label. In some embodiments, the thread label creation interface 2200 may provide a user with the option to select a photo to serve as the wallpaper background for the secondary messaging interface that displays the messages associated with the thread label being created (e.g., instead of the secondary messaging interface having a solid or otherwise plain background, the background could be comprised of a photo selected by a user).

Further, in some embodiments, thread label creation interface 2200 may provide a user with options to customize other elements of the secondary messaging interface, such as the color, size, shape, or emphasis of the various elements on the secondary messaging interface (e.g., the send, camera and other icons, the color of the message bubbles, etc.) in order to be more relevant to or reflective of the topic or purpose of the thread label. For example, when a user creates a thread label, from thread label creation interface 2200 or from a different interface, the user could set a color parameter to "red" (causing one or more elements on the secondary messaging interface to be displayed in a red color instead of a default color for all (or select) participants to the conversation). Further, if a custom color or color scheme is associated by a user with a particular thread label, then on the primary messaging interface, messages associated with that thread label may be displayed in that color for all participants to the conversation to make it more readily apparent that those messages have been associated with that thread label, and further to distinguish them from messages associated with a different thread label or no thread label at all. In some embodiments, a user may select a color (or other customizable visual parameter) to be associated with a thread label at the time the thread label is created, or subsequent to its creation (e.g., from a thread edit interface).

As further shown, thread label creation interface 2200 may enable a user to select an image or photo to associate with the given thread label by, for example, tapping on "Add Photo" button 2204. The image or photo the user selects may be provided as a thumbnail in connection with the thread label and may replace the default thumbnail 2205. In some embodiments, upon providing the desired input into the "New Thread" screen, a user may execute the creation and storage of the thread label within system 1000 by pressing create icon 2207. Once created, thread labels may appear within a segment of the primary messaging interface 2100 such that a user may select one or more of the thread labels to associate with a given message. Such an example is shown in FIG. 2C.

Figure 2C:
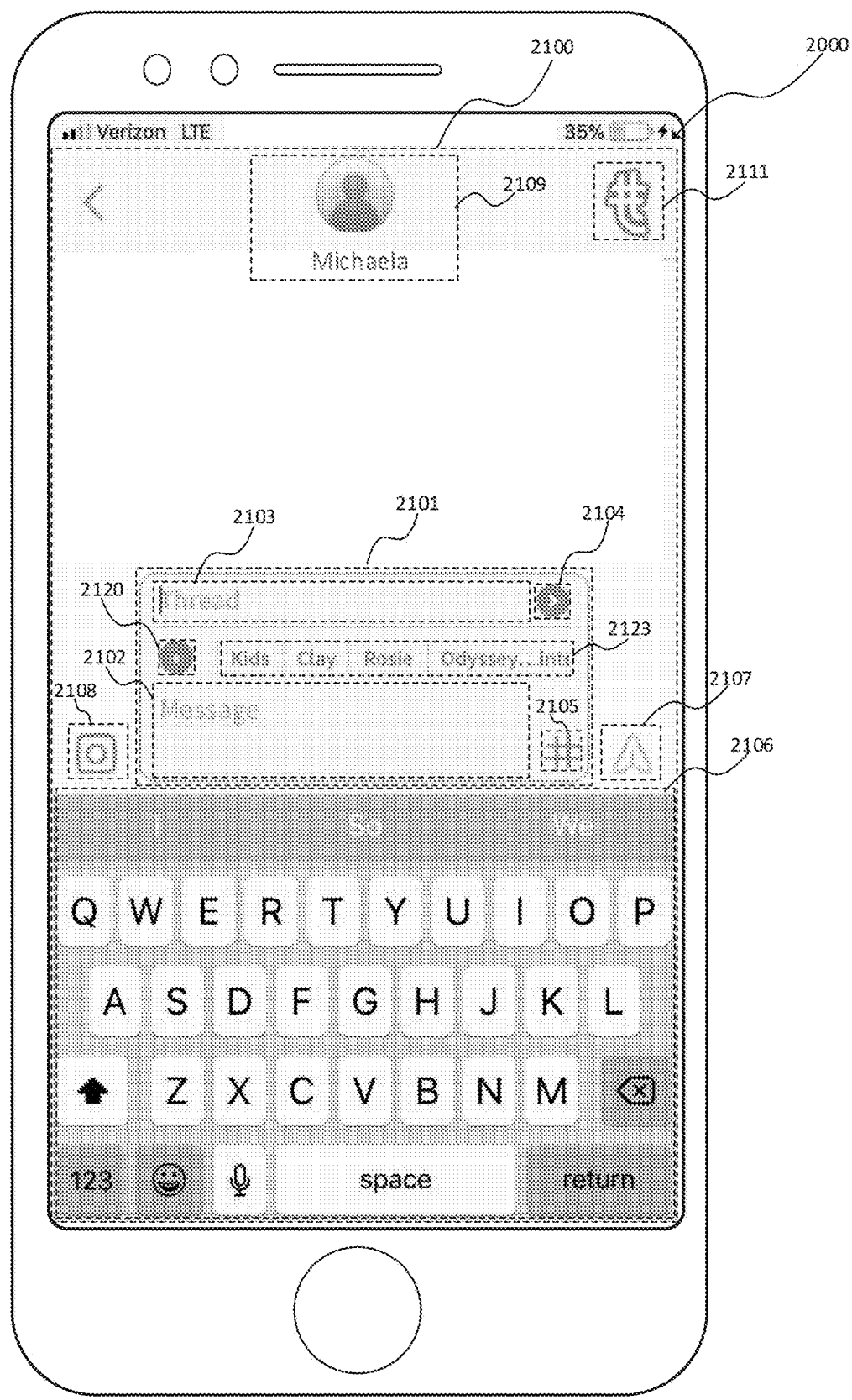
FIG. 2C illustrates an example primary messaging interface after one or more thread labels have been created, as may be implemented in accordance with one or more embodiments of the present disclosure.

FIG. 2C illustrates an example primary messaging interface 2100 after one or more thread labels have been created for a given conversation, as may be implemented in accordance with one or more embodiments of the present disclosure. The two parties to the given example conversation referred to in FIG. 2C (as well as in FIGS. 2D-7) will be, by way of example, a couple named Trevor (husband) and Michaela (wife) who have two children (Clayton and Rose) and drive a Honda Odyssey. FIG. 2C depicts how an example primary messaging interface 2100 may appear to Trevor when composing his first draft message to Michaela (as denoted by recipient identifier 2109). The previously created thread labels provided for user selection in thread selector bar 2123 may include, for example, "Kids," "Clay," "Rosie," and "Odyssey Maintenance," among others. Such thread labels may have been created by any party to a conversation, in this example, Trevor or Michaela.

As shown, a thread selector bar 2123 may be provided in primary messaging interface 2100 such that a user (here, Trevor) may select one or more of the thread labels previously created to associate with messages (e.g., by tapping on the thread label the user wishes to associate with a designated message). In some embodiments, it may be undesirable to display all of the previously created thread labels at once, and in such embodiments a user may optionally scroll through the previously created thread labels by swiping his or her finger (e.g., left or right, up or down, etc.) along the thread selector bar 2123. Also, in some embodiments a thread label may have a lengthy name, and in such embodiments the lengthy name may be abbreviated, truncated or otherwise condensed when displayed for user selection in thread selector bar 2123. An example of this is shown in FIG. 2C, where the thread label "Odyssey Maintenance" has been truncated with an ellipsis.

In addition to thread selector bar 2123, primary messaging interface 2100 may also include another thread label creator 2120 which, when selected by a user, may either (a) navigate the user to the thread label creation interface 2200 where the user could create a new thread label or (b) allow the user to create a new thread label from within the primary messaging interface 2100. Option (b) may not provide the user with all of the options available via the thread label creation interface 2200 (e.g., the add photo to create thumbnail feature, the thread description feature, etc.), but may at least provide the user with a mechanism to define the name of a new thread label without having to navigate away from the primary messaging interface 2100. Later, a user may navigate to the thread label creation interface 2200, or a similar interface, to edit the thread label previously created via the thread selector bar.

Figure 2D:
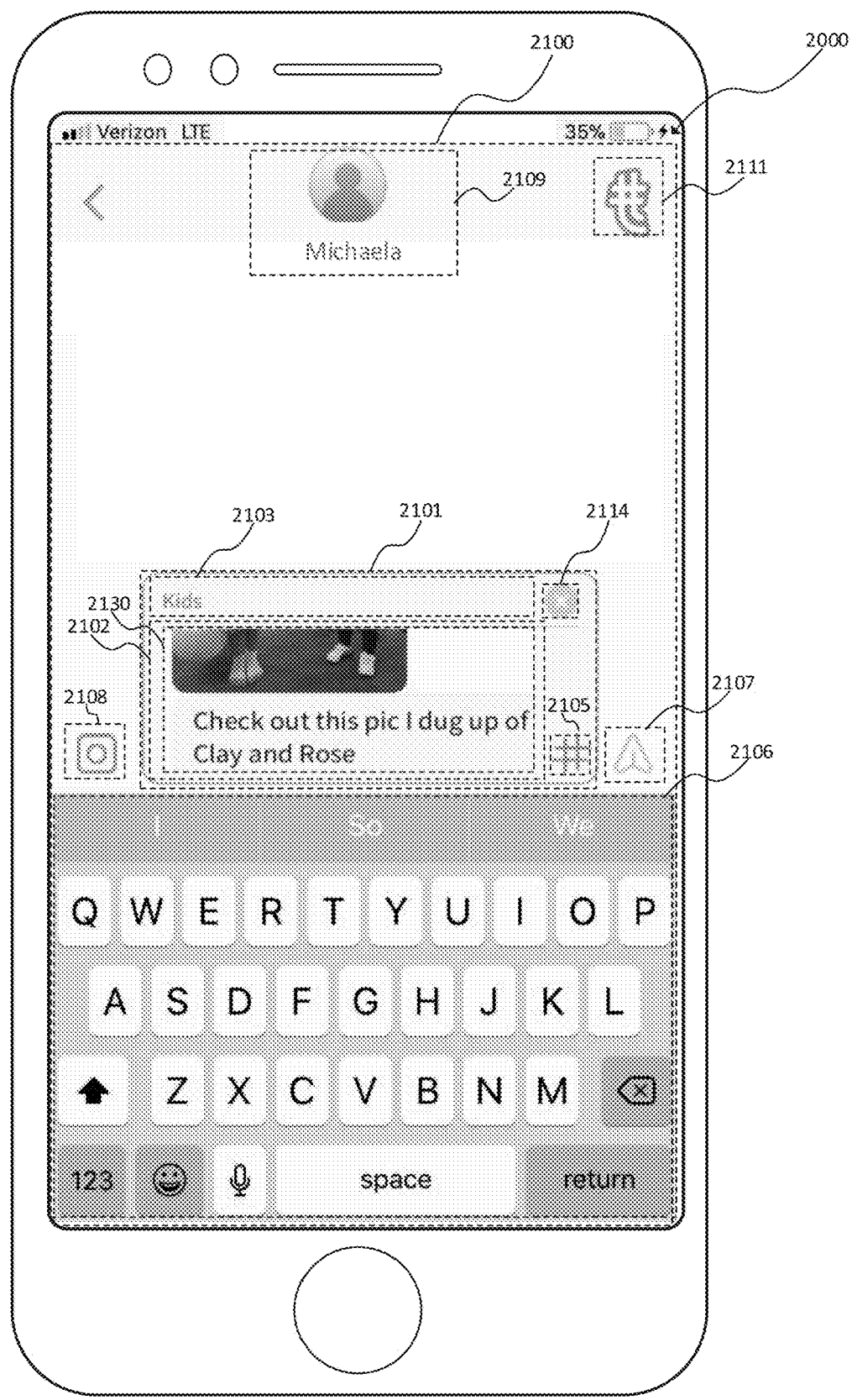
FIG. 2D illustrates an example primary messaging interface after a previously created thread label has been selected for association with the outgoing message being composed, in accordance with one or more embodiments of the present disclosure.

Once a user has selected a thread label, the selected thread label may appear in thread bar 2103, indicating to the user that any message sent while the given thread label is selected will be associated with the given thread label in the global conversation feed. An example selection is shown in FIG. 2D. If a user has selected a thread label but then decides that one or more different thread labels, or no thread label at all, should be associated with a message that has been composed but not yet transmitted, the user may either (a) tap on thread clear button 2114 which may cause (i) the already selected thread label displayed in thread bar 2103 to be cleared or removed and (ii) thread selector bar 2123 (from FIG. 2C) to be displayed from which the user may then select one or more different thread labels or no thread label at all, or (b) tap on threading button 2105 which may remove the already selected thread label from thread bar 2103 and dismiss thread bar 2103 and thread clear button 2114 altogether. Further, in some embodiments, thread bar 2103 may only appear after a thread label has been selected from the thread selector bar 2123.

FIG. 2D illustrates an example primary messaging interface 2100 after a created thread label has been selected such that it is associated with the outgoing message being composed, in accordance with one or more embodiments of the present disclosure. As shown, the thread label "Kids" has been selected by the user (Trevor) and now appears in thread bar 2103. In this example, it appears that Trevor has selected thread label "Kids" because his message pertains to both of his children. Thus, upon pressing send button 2107, Trevor's message 2130 as composed in message composition zone 2102 will be transmitted to Michaela's computing device (e.g., smartphone, tablet, etc.), and displayed in a conversation pane within primary messaging interface 2100 on Trevor's computing device (e.g., smartphone, tablet, etc.).

One of ordinary skill in the art will appreciate that electronic messages may include one or more of text, photos, videos, graphics, and other multimedia (e.g., GIFs) as may exist from time to time and that users may send to each other through electronic messaging. Here, the message includes a photo with corresponding text. It should also be appreciated that, although not explicitly shown in FIG. 2D, in some instances a user may select more than one thread label to associate with a given message. For example, because Trevor's message to Michaela pertains to both children, Clay and Rose, Trevor may have also selected the thread label "Clay" as well as the thread label "Rose" instead of, or in addition to, the thread label "Kids." Of course, users may select any previously created thread labels to associate with their messages for any reason or based on any criteria— e.g., the description of the thread label, a common understanding between the parties to the conversation about what the thread label means or implies, an individual understanding of the meaning of a term within the name of the thread label, etc. As noted, upon pressing send button 2107, Trevor's message 2130 as composed in message composition zone 2102 will be transmitted to Michaela's computing device (e.g., smartphone, tablet, etc.) and may be displayed in the conversation pane within the primary messaging interface 2100 on Trevor's computing device (e.g., smartphone, tablet, etc.). Similarly, Trevor's message 2130 will be transmitted such that it may be displayed in a complementary conversation pane within a primary messaging interface at Michaela's computing device (e.g., smartphone, tablet, etc.).

Figure 2E:
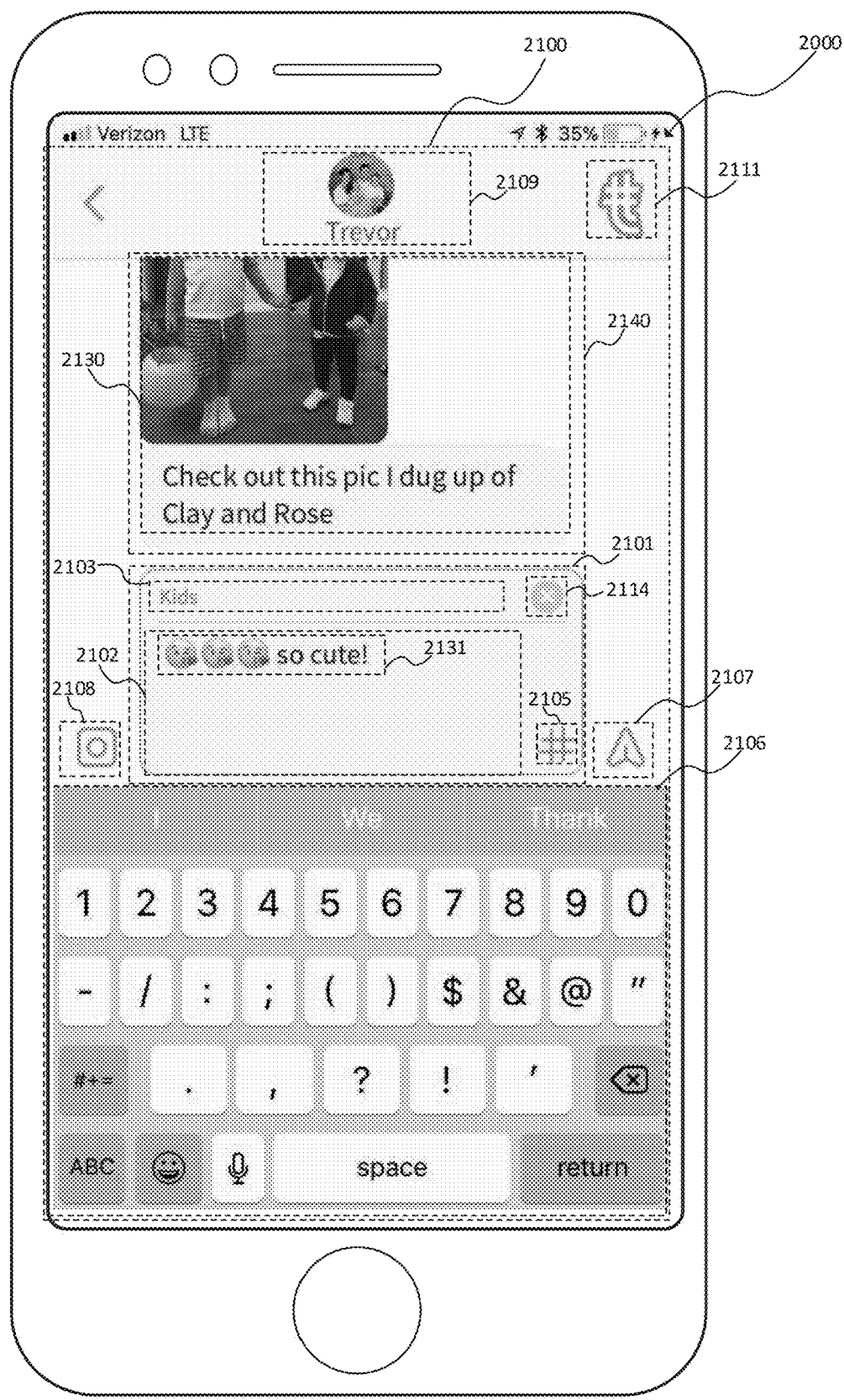
FIG. 2E illustrates an example primary messaging interface at the client computing device of the recipient receiving the outgoing message shown in FIG. 2D, here illustrating an embodiment where the thread label of the received message is optionally automatically selected as the thread label to be associated with the recipient's responsive message, in accordance with one or more embodiments of the present disclosure.
Figure 2F:
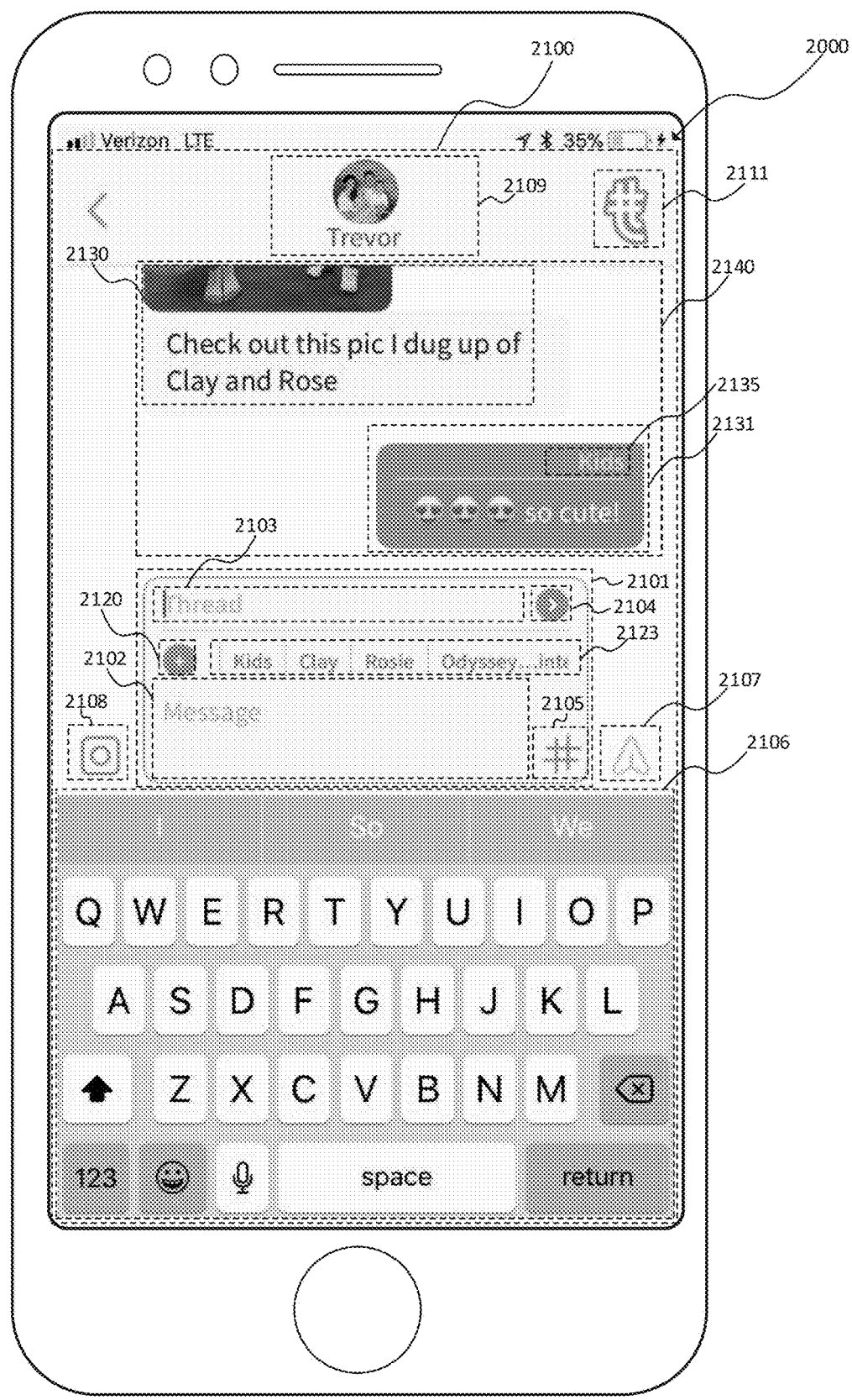
FIG. 2F illustrates an example primary messaging interface at the client computing device of the recipient receiving the outgoing message shown in FIG. 2D, here illustrating the option to change the thread label associated with a subsequent message, thereby signaling a change in the topic of conversation. The illustration depicts options available to the user while composing a new message, by way of example. The user may associate a thread label to the new message that is different than the thread label of the previously sent or received messages, in accordance with one or more embodiments of the present disclosure.

FIG. 2E illustrates an example primary messaging interface at the computing device of the recipient (here, Michaela) receiving the outgoing message (from Trevor) shown in FIG. 2D. As shown, Trevor's message 2130 including the photo and text may appear in a complementary conversation pane 2140 on Michaela's computing device. Trevor's message 2130 may be labeled with the thread label "Kids" within conversation pane 2140 for Michaela's viewing (the label is not shown in FIG. 2E due to space constraints, but an example of labeling is shown in FIG. 2F as to Michaela's response to Trevor's message). Furthermore, the recipient's computing device may automatically select the thread label associated with the sender's message, such that the same thread label is associated with the recipient's response to the sender's original message.

FIG. 2E provides an example illustration of an embodiment where the thread label of the received message is automatically selected for association with the recipient's responsive message. As shown, since Trevor selected the "Kids" thread label to be associated with his message 2130 to Michaela, the same thread label may be automatically selected (and provided in thread bar 2103 shown on the primary messaging interface 2100 at Michaela's computing device) and associated with Michaela's message 2131 in response. In some embodiments, the automated selection of a thread label may only occur with respect to messages sent or received within a predetermined timeframe. In some embodiments, a recipient may change, remove, or modify the automatically selected thread label(s). And in still further embodiments, no automatic selection operation may be performed by system 1000 at all, and in such embodiments the recipient may manually associate the same, different, or no thread label to his or her response to a sender's message that was associated with a thread label.

If a thread label has been automatically selected but the user decides that one or more different thread labels, or no thread label at all, should be associated with a message that has been composed but not yet transmitted, the user may either (a) tap on thread clear button 2114 which may cause (i) the automatically selected thread label displayed in thread bar 2103 to be cleared or removed and (ii) thread selector bar 2123 (from FIG. 2C) to be displayed from which the user may then select one or more different thread labels or no thread label at all, or (b) tap on threading button 2105 which may remove the automatically selected thread label from thread bar 2103 and dismiss thread bar 2103 and thread clear button 2114 altogether.

FIG. 2F illustrates an example primary messaging interface at the smartphone of the original recipient (Michaela) after receiving and responding to the outgoing message 2130 from Trevor with the automatically selected "Kids" thread label associated with the response. As shown, Michaela's responsive message 2131 bears the thread label "Kids" (denoted by the "Kids" label in typeface above a line over the text and graphics in message 2131). As further shown in FIG. 2F, Michaela may compose another message that completely changes the topic of conversation, and further may associate a different thread label, or no thread label at all, with her outgoing message (and vice versa for Trevor).

Figure 2G:
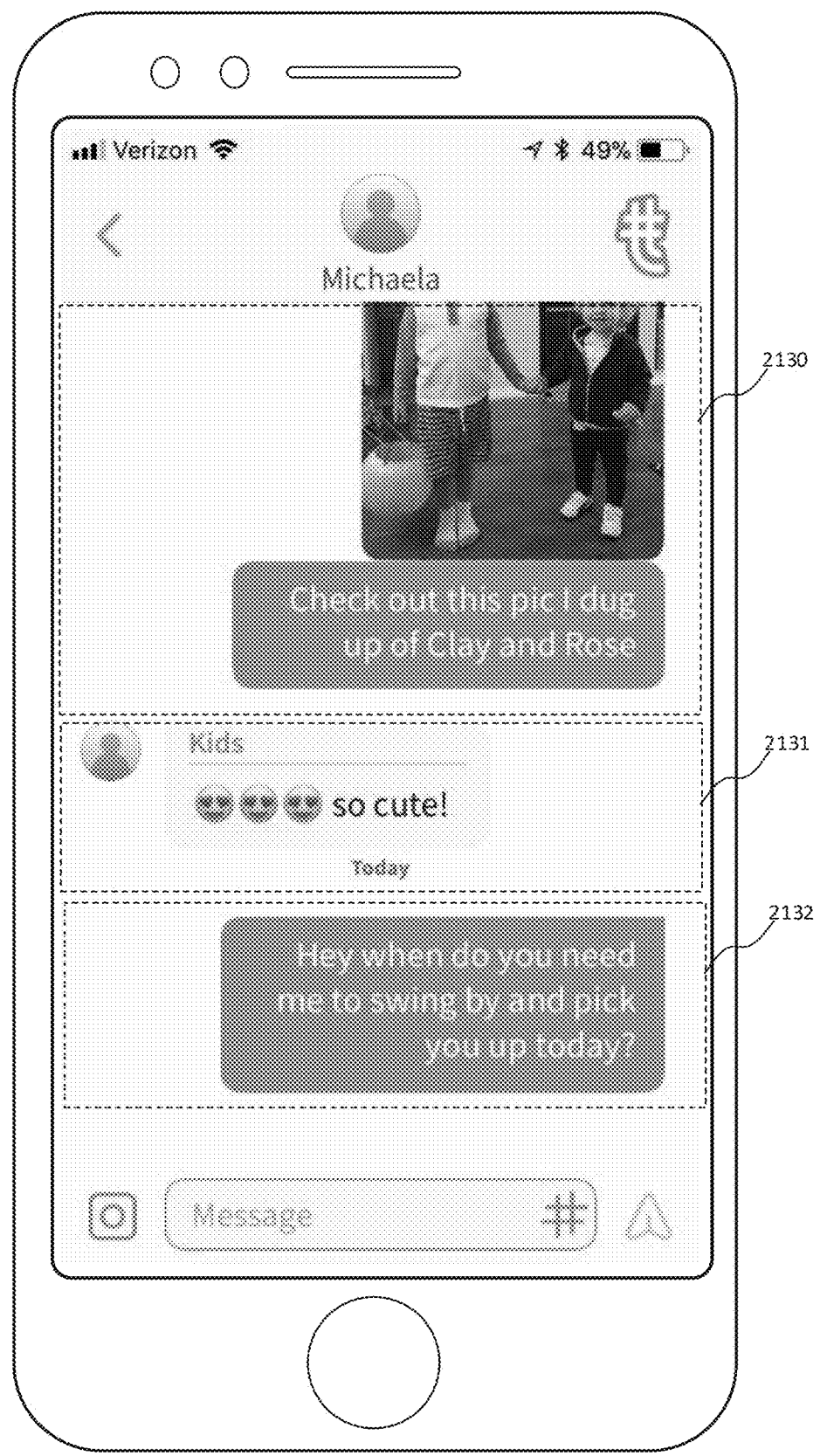
FIG. 2G illustrates an example conversation feed of a primary messaging interface including a message that has been associated with a thread label, as well as a message that has not been associated with any thread label at all, in accordance with one or more embodiments of the present disclosure.

FIG. 2G illustrates an example message 2132 that Trevor might send to Michaela after Michaela has sent message 2131 to Trevor, but which is not associated with any thread label at all (either because Trevor disassociated his next message from the "Kids" label if an auto-selection feature was triggered, or because Trevor never selected a thread label to be associated with his response and no auto-selection feature was triggered). As may be seen, Trevor's message 2132 does not bear the "Kids" thread label that message 2131 bears, nor does it bear any thread label at all. Thus, as shown, in some embodiments a global conversation feed displayed in a conversation pane of the present disclosure may simultaneously include messages including the same thread labels, different thread labels, or no thread labels at all between parties to a conversation. However, in other cases users may not wish to see both threaded and unthreaded messages in the same conversation feed (a global conversation feed), and may instead wish the primary messaging interface to show only unthreaded messages (a limited conversation feed). An optional modified primary messaging interface may be made available to a user for this purpose, discussed in more detail in connection with FIGS. 4A-B).

In some embodiments, the technology of the present disclosure allows parties to a conversation to use thread labels to categorize subsets of their global conversation feed to various topics about which they are referring in a given subset of back-and-forth messages. A user may thereby more seamlessly view a conversation about a particular topic in a streamlined context (e.g., without seeing interwoven messages about different topics), and search for a particular message with more ease and organization, among other various advantages. For example, suppose Trevor wishes to refer back to a particular message that Michaela sent him about the "Kids." Instead of scrolling back through the entire global conversation feed between he and Michaela, Trevor may more easily search for and locate the message by, for example, selecting TLVF button 2111 to view a filter interface showing all of the previously created thread labels that have been established between he and Michaela, then selecting the "Kids" thread label to filter out all the non-"Kids" labeled messages such that he sees only those messages associated with exchanges pertaining to the "Kids."

Figure 2H:
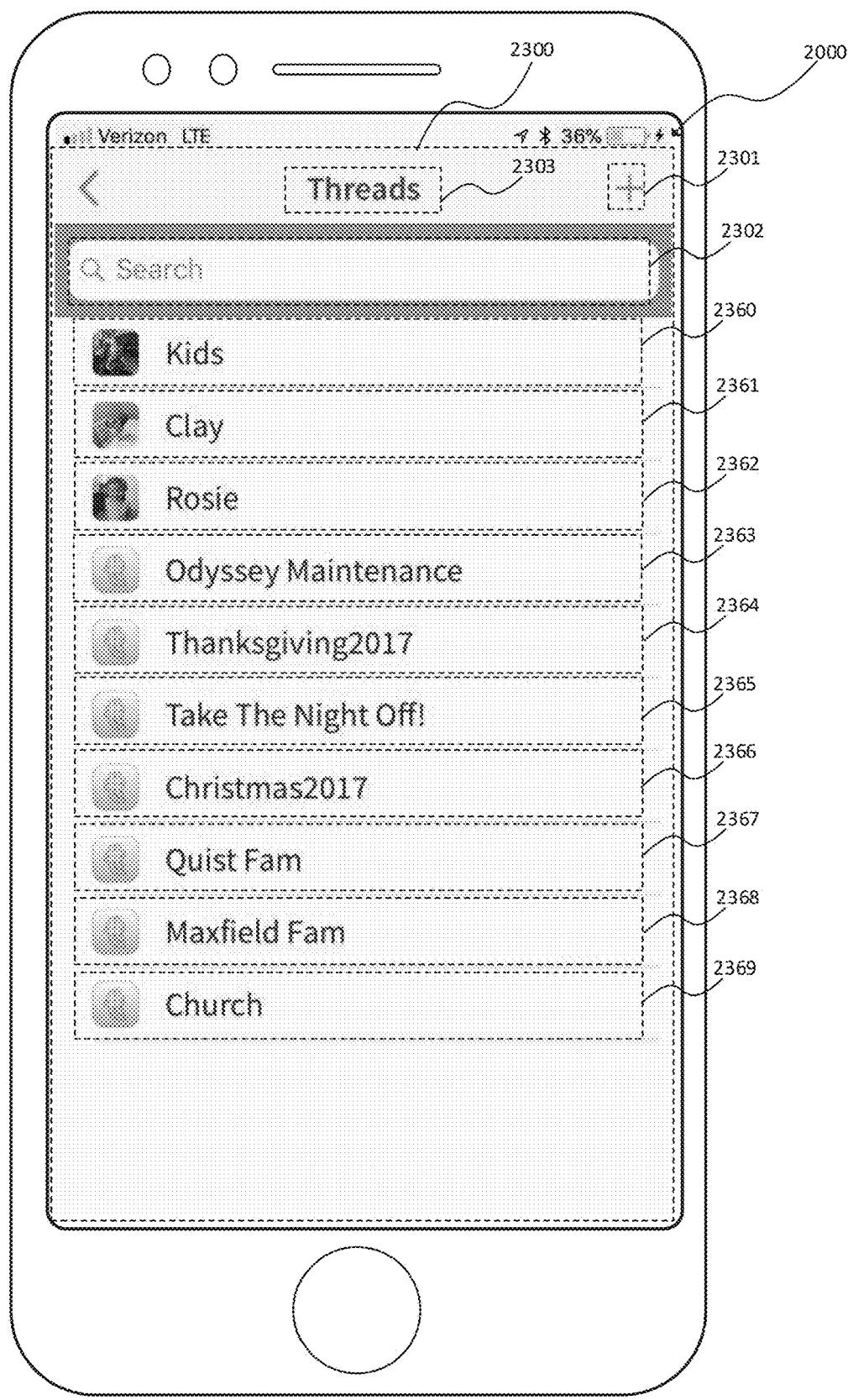
FIG. 2H illustrates an example filter interface where a user may view all thread labels created within a particular conversation, select a thread label of interest and thereby navigate to a view displaying only messages associated with the selected thread label, in accordance with one or more embodiments of the present disclosure.

FIG. 2H illustrates an example filtered interface 2300 where a user may view all thread labels created within a particular conversation, select a previously created thread label of interest and view only messages in the conversation that are associated with the selected thread label (e.g., in a filtered conversation interface, also referred to herein as a secondary messaging interface). As shown in FIG. 2H, Trevor and Michaela have created ten thread labels (thread labels 2360-2369). Thus, for example, if as noted above Trevor is searching for a message pertaining to the "Kids" thread label, he may select the "Kids" thread label 2360 via filter interface 2300 to navigate to a filtered conversation interface (also referred to herein as a secondary messaging interface) showing only those messages associated with the "Kids" thread label. Before discussing in detail the secondary messaging interface features of the present disclosure, it should be noted here with reference to FIG. 2H that some of the thread labels have been defined with photos provided as thumbnail images (e.g., thread labels 2360-2362), and others have not been so defined and have instead been given a default thumbnail image (e.g., thread labels 2363-2369).

One of ordinary skill in the art will appreciate that customizable thumbnails may, but need not, be used in any given implementation of embodiments of the presently disclosed technology.

In some embodiments, the list of thread labels in such an example filtered interface 2300 may be organized alphabetically, by number of unread messages (e.g., thread label with the most unread messages positioned furthest to the top, followed by thread labels in order of decreasing number of unread messages proceeding below), or by most recent activity (e.g., most active thread label positioned furthest to the top, followed by thread labels in order of decreasing activity proceeding below).

In some embodiments, thread label thumbnails (or other graphics) shown in the list of thread labels may include dynamic counters providing a user with insight as to the number of unread messages that have been associated with the corresponding thread label. In some embodiments, thread label thumbnails (or other graphics) shown in the list of thread labels (or elsewhere) that have unread messages may be outlined with a different color (e.g., outlined in red or another specific color, or color scheme, selected by a user to be associated with that thread label) to differentiate such thread labels from those that have no unread messages.

Referring still to FIG. 2H, if a user desires to create a new thread label, the user may select thread creator 2301 which may navigate the user to the "New Thread" screen referred to above. Further, a user may search for thread labels by using search bar 2302. Upon the occurrence of such a text search, filtering component 1043 may present a limited view of the thread labels, the limited view showing only those thread labels associated with a message that contains the text the user entered as part of the user's search query and/or those thread labels with names that contain the text the user entered as part of the user's search query.

Figure 2I:
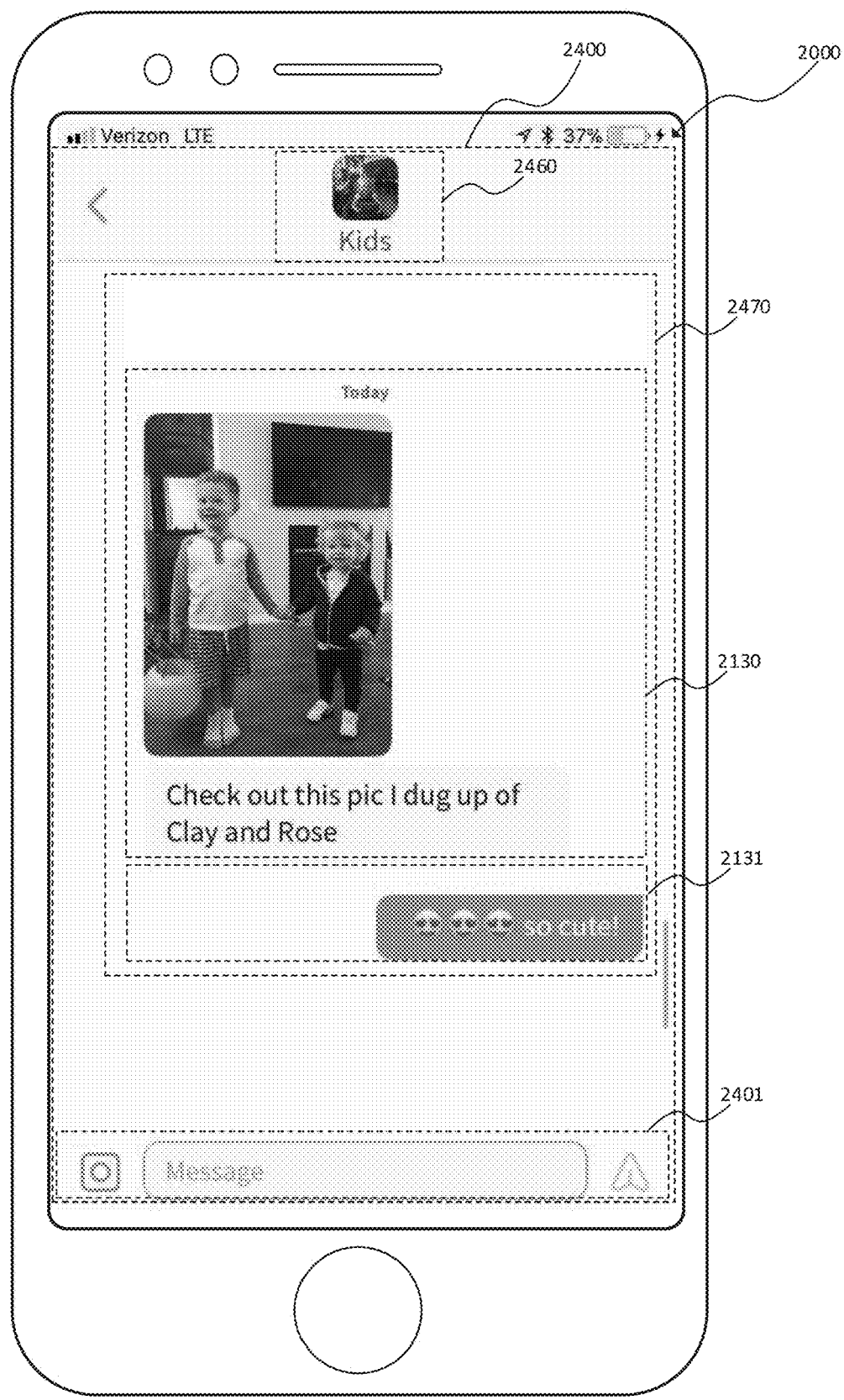
FIG. 2I illustrates an example filtered conversation interface where a user may view messages that have been associated with a particular thread label (e.g., by selecting a particular thread label) as filtered from the remaining messages that occurred within an entire messaging conversation, in accordance with one or more embodiments of the present disclosure. Also as illustrated, in some embodiments the filtered conversation interface may be operable as a secondary messaging interface, and thus may sometimes be referred to herein as a secondary messaging interface.

Referring now to FIG. 2I, this figure illustrates an example secondary messaging interface 2400 where system 1000 may provide a filtered view of a conversation between parties that pertain to a particular thread label. Extending the example above, suppose that Trevor's and Michaela's entire conversation feed (accessible through conversation pane 2140 in the primary messaging interface 2100) included over 500 messages—many if not all of which have been associated with at least one of the thread labels shown in FIG. 2H—but only three of those messages (those shown in FIGS. 2D-2F) were associated with the "Kids" thread label. Thus, if Trevor selects the "Kids" thread label 2360 on filter interface 2300, his computing device may navigate to a secondary messaging interface that shows only those three messages that have been associated with the "Kids" thread label. FIG. 2I depicts an example secondary messaging interface 2400 displaying only those messages that have been associated (by either party to the conversation) with the "Kids" thread label.

Secondary messaging interface 2400 may also include a conversation pane 2470 where messages associated with a particular thread label, that have already been transmitted between users in the conversation, may appear. The conversation pane 2470 of secondary messaging interface 2400 may display all or part of the messages associated with a particular thread label, such as the messages that have been associated with the "Kids" thread label, shown in FIG. 2I. In some embodiments, a user may scroll upward or downward within conversation pane 2470 to view more recent or older messages.

As further shown in FIG. 2I, secondary messaging interface 2400 may include a thread label identifier 2460 which identifies the thread label associated with the secondary messaging interface. Thread label identifier 2460 may include any type of alphanumeric characters, graphics, and/or any symbolic identifiers as desired. FIG. 2I depicts an example thread label identifier 2460 for a thread label entitled "Kids" that a user has selected a photo to be associated with.

In some embodiments, a user may decide to send a message entirely within the secondary messaging interface 2400 (for ease of viewing, or to respond to a particular message that was much earlier in the global conversation feed that the user does not want to go back and find in the global conversation on the primary messaging interface, etc.). As shown in FIG. 2I, a user may employ messaging tools 2401 within the secondary messaging interface to send a message that will automatically be associated with the thread label of the given secondary messaging interface (i.e., without the user having to take an extra step to associate or re-associate the message with the thread label by virtue of being sent from within the secondary messaging interface instead of the primary messaging interface). A message sent from the secondary messaging interface may also automatically be displayed on the primary messaging interface with a heading indicating that the message sent from the secondary messaging interface is associated with the thread label associated with the secondary messaging interface.

Figure 2J:
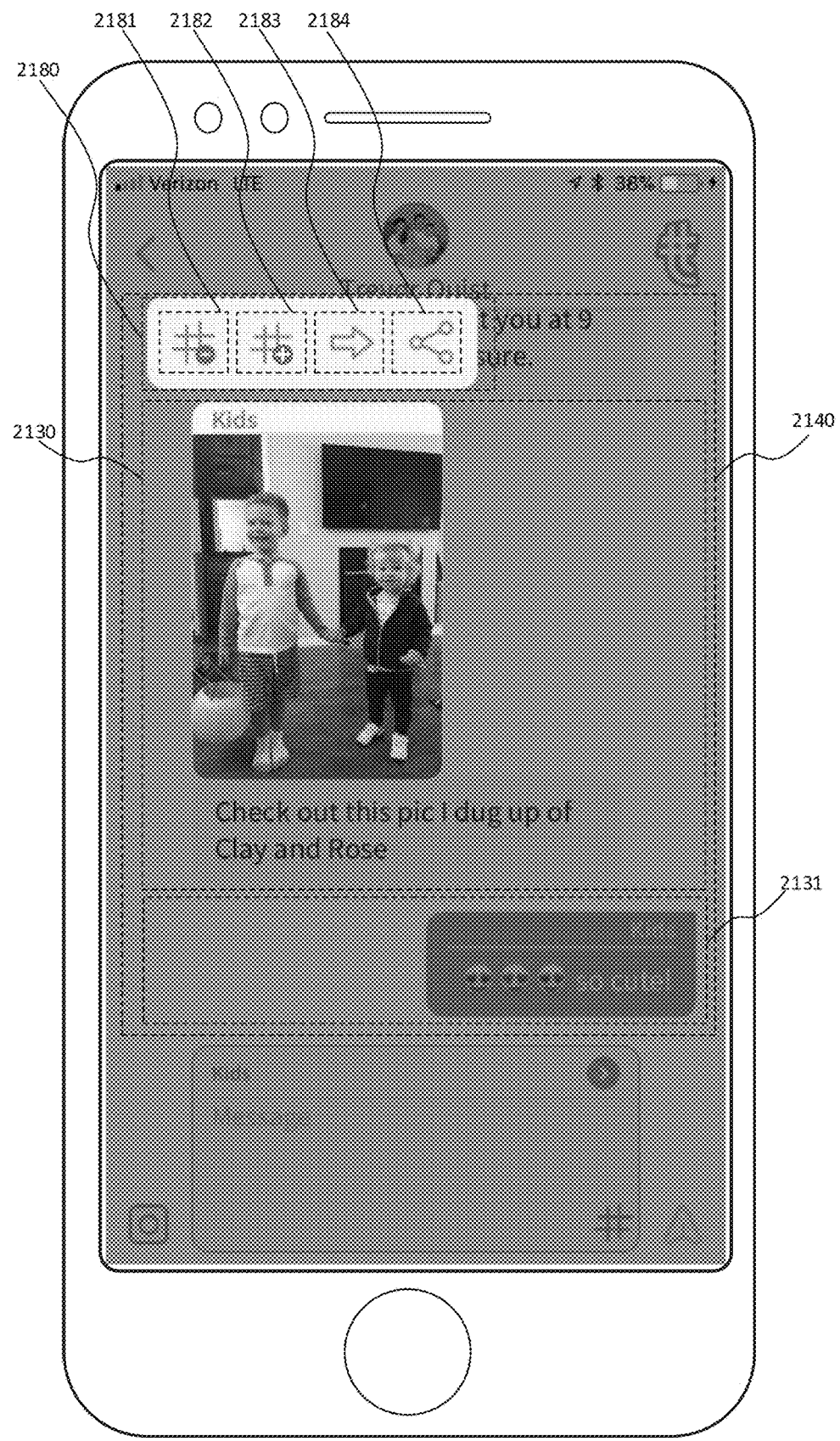
FIG. 2J illustrates an example primary messaging interface where a user may remove a thread label that was previously associated with a message (also referred to herein as disassociating a thread label with a message), change the thread label associated with a message, and/or add a thread label (also referred to herein as associating a thread label with the message) to a message, in each case, even after the message has already been transmitted or received, among other features, in accordance with one or more embodiments of the present disclosure.

In some embodiments, a user may remove, change, and/or add a thread label associated with a message after the message has been transmitted to a recipient. For instance, FIG. 2J illustrates an example primary messaging interface where a user may remove a thread label from a previously sent message already associated with a thread label. In some embodiments the primary messaging interface may, responsive to a user pressing and holding on a message that has already been transmitted, present the user with one or more post-transmission options. For example, as shown in FIG. 2J, post-transmission options 2180 may include a thread label deletion button 2181, a thread label addition button 2182, a message forward button 2183, and/or a message share button 2184. The thread label deletion button 2181 may be configured, upon selection, to disassociate from a designated message a previously associated thread label. Thread label addition button 2182 may be configured, upon selection, to associate a designated message with a thread label that was not then associated with the designated message. Message forward button 2183 may be configured, upon selection, to enable the user to forward a selected message to another recipient connected with system 1000. Message share button 2184 may be configured, upon selection, to enable the user to share a selected message through connection to another communication platform (e.g., email, a different messaging app, Facebook, etc.). It should be appreciated that the threading component of system 1000 enables users to associate and disassociate one or more thread labels with one or more messages, and further, that any association or disassociation by a user will be reflected on the devices of all participants to a conversation. In some embodiments, the post-transmission options may include a thread label switching button that would allow a user to disassociate a message from a particular thread label and select a different thread label to associate with the message. In some embodiments, users would be able to select multiple messages at a time and select a post-transmission option to, for example, associate multiple messages at the same time with the same thread label.

In some embodiments, the aforementioned post-transmission options may, alternatively or additionally, be made available to a user through other interfaces of the present disclosure, for example, secondary messaging interfaces, multimedia interfaces (e.g., thread label associated album interface shown in FIG. 7), opening interfaces, or any other interfaces of the present disclosure.

In some embodiments, thread bars or other elements of the primary messaging interface may dynamically respond to user interaction with a thread label. For example, a user tapping on a thread label associated with a message may cause the thread bar to become populated with the thread label, or combination of thread labels, associated with the tapped message. Referring back to FIG. 2F, for instance, when a user taps thread label 2135 associated with message 2131, thread bar 2103 may, without any further user action, become populated with the thread label, here "Kids," such that the user's next message will be associated with the "Kids" thread label without further navigation by the user.

In another example of dynamic responses to user interactions with thread labels, a user may press and hold on a thread label, and in response thereto the user may be navigated to the secondary messaging interface or a filtered conversation interface that only contains messages that have been associated with the thread label. Referring back to FIG. 2F, for instance, when a user presses and holds thread label 2135 associated with message 2131, the user may be navigated to a secondary messaging interface or a filtered conversation interface associated with the "Kids" thread label.

Figure 2K:
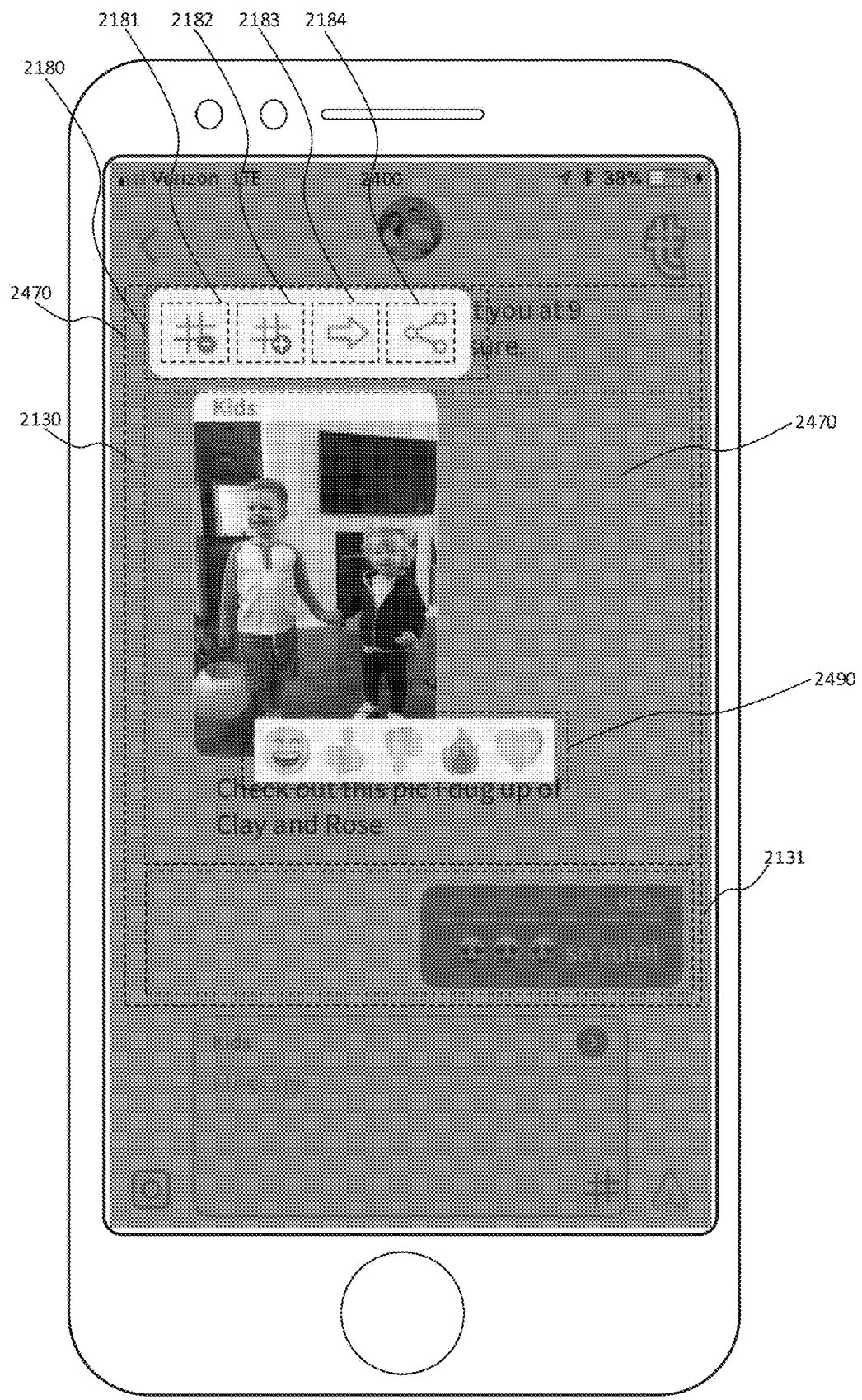
FIG. 2K illustrates an extension of the example primary messaging interface in FIG. 2J, where a user may not only be enabled to remove a thread label from a previously sent message already associated with a thread label, but may also be enabled to react to or otherwise emphasize a message using emoticons or other graphical elements.

FIG. 2K illustrates an extension of the example primary messaging interface in FIG. 2J, where a user may not only be enabled to remove a thread label from a previously sent message already associated with a thread label (or perform any of the other previously described post-transmission options), but may also be enabled to react to or otherwise emphasize a message using emoticons or other graphical elements. For instance, in some embodiments the primary messaging interface or the secondary messaging interface may, responsive to a user pressing and holding on a message that has already been transmitted, present the user with one or more reaction options 2490 to associate a reaction to such message (which may be propagated to the other users in the conversation).

Figure 2L:
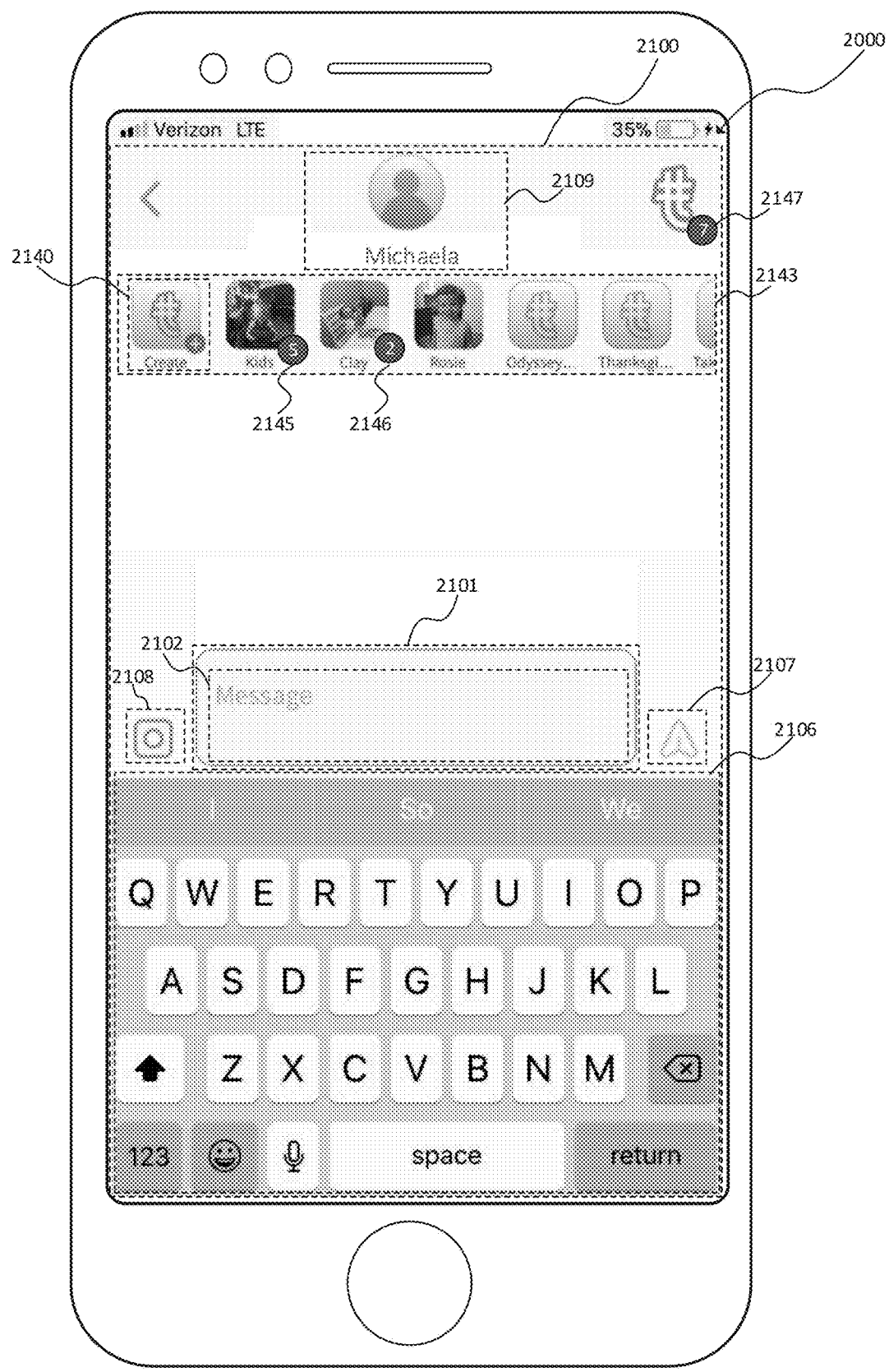
FIG. 2L illustrates an example messaging interface including another example thread bar in accordance with various embodiments of the present disclosure.

It will be appreciated that the layout of features and functionality disclosed herein is not intended to be limiting. For example any one or more of the thread bar 2103, thread label creator 2120, thread adder 2104, and/or thread bar 2123 introduced with reference to FIGS. 2C-D may be implemented, additionally or alternatively, using a different layout. For example, FIG. 2L illustrates an example interface where such thread creation, viewing, and adding features are made available in the form of a thread bar 2143 near the top of the messaging interface, including a thread label creator 2140. Though shown alone in FIG. 2L, thread bar 2143 may be presented on any interface within the mobile application (e.g., primary messaging interface, secondary messaging interface, etc.), alone or in addition to other thread label tools (e.g., thread bar 2103, thread label creator 2120, thread adder 2104, and/or thread bar 2123) made available in other zones of such interfaces. Thread bar 2143 may be responsive to user gestures, including but not limited to: a user swiping left or right along the bar to scroll or otherwise navigate through thread labels, or tapping in the space above, on, or near thread bar 2143 to hide or reveal the thread bar 2143 within the interface view. For example, in some embodiments, thread bar 2143 automatically appears whenever a user accesses the primary messaging interface, and may be easily dismissed by tapping in the blank space in the header (or other designated space), scrolling up/down through the chat history, or by tapping in message composition zone 2102. In some embodiments, if the thread bar 2143 is hidden/collapsed, tapping in the blank space in the header (or other designated space) may cause the thread bar 2143 to reappear.

In some embodiments, thread bar 2143 may display existing thread labels (e.g., using a thumbnail, text, or other graphic) organized alphabetically, by number of unread messages (e.g., thread label with the most unread messages positioned furthest to the left, followed by thread labels in order of decreasing number of unread messages proceeding to the right), or by most recent activity (e.g., most active thread label positioned furthest to the left, followed by thread labels in order of decreasing activity proceeding to the right).

In some embodiments, thread label thumbnails (or other graphics) shown in thread bar 2143 may include dynamic counters (e.g., counter 2145, 2146) providing a user with insight as to the number of unread messages that have been associated with the corresponding thread label. In some embodiments, thread label thumbnails (or other graphics) shown in thread bar 2143 (or elsewhere) that have unread messages may be outlined with a different color (e.g., outlined in red or another specific color, or color scheme, selected by a user to be associated with that thread label) to differentiate such thread labels from those that have no unread messages. In still further embodiments, a dynamic counter (e.g., counter 2147) displayed on or near thread label viewing/filtering button ("TLVF" button) 2111 may provide a total count of unread messages associated with at least one thread label.

A user may navigate from the primary messaging interface 2100 to a secondary messaging interface associated with the thread label by selecting the thread label of interest from thread bar 2143.

Figure 2M:
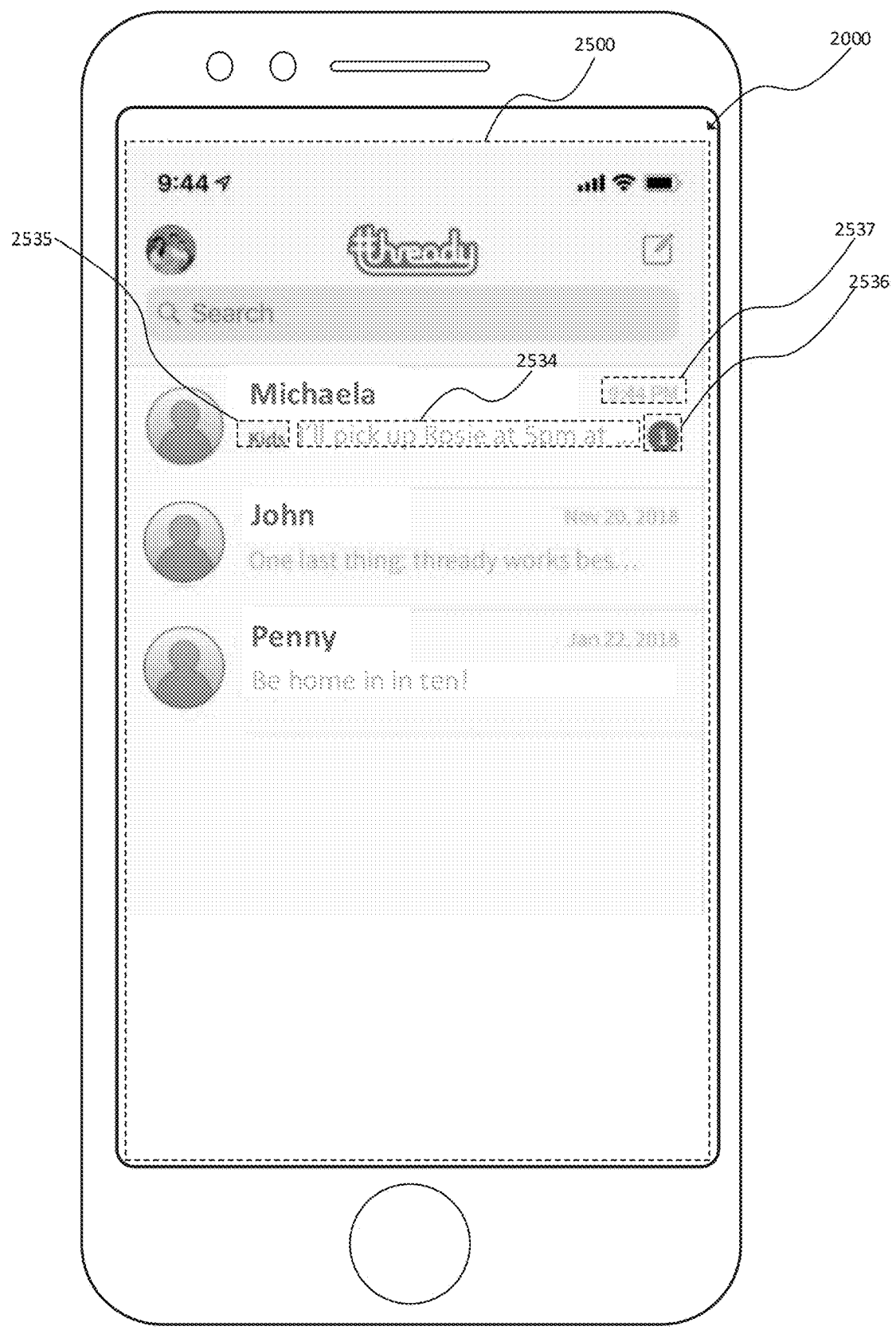
FIG. 2M illustrates an example interface including an overview of recent users with whom the user has sent and/or received messages, including thread label indications of recently received messages in accordance with various embodiments of the present disclosure.

FIG. 2M illustrates an example opening interface including an overview of recent users with whom the user has sent and/or received messages with, including thread label indications of recently received messages in accordance with various embodiments of the present disclosure. As shown, opening interface 2500 may include a listing or other indication of other users with whom messages have been received and/or transmitted. For instance, as shown, the user of the device shown (e.g. Trevor, from the aforementioned examples) has recently received and/or transmitted messages to other users named Michaela, John, and Penny. The listing or other indication may also include one or more of: a message preview 2534 showing all or a portion of a recent message sent to or received from the user (here, showing the last message received from Michaela); a thread label 2535 associated with a recent message sent to or received from the user (here, showing that Michaela's last message has been associated with the "Kids" thread label, so the thread label 2535 appears within the listing); an unread message counter 2536 providing a user with insight as to the number of unread messages sent from Michaela; a time or date indicator 2537 providing a user with insight as to the date/time at which the most recent message was sent or received. In some embodiments, opening interface 2500 may optionally be presented within GUI 2000 upon a user initially opening or reopening the mobile application on their mobile computing device.

In some embodiments, the listing displayed in such an example opening interface 2500 may be organized alphabetically, by number of unread messages (e.g., ordering the listing of users such that user associated with the most unread messages is positioned furthest to the top, followed by other in order of decreasing number of unread messages proceeding below), or by most recent activity (e.g., most active users positioned furthest to the top, followed by other users in order of decreasing activity proceeding below), or by date/time of received and/or sent messages (e.g., user associated with the most recently sent message positioned furthest to the top, followed by other uses in order of most recent message timing).

Figure 3A:
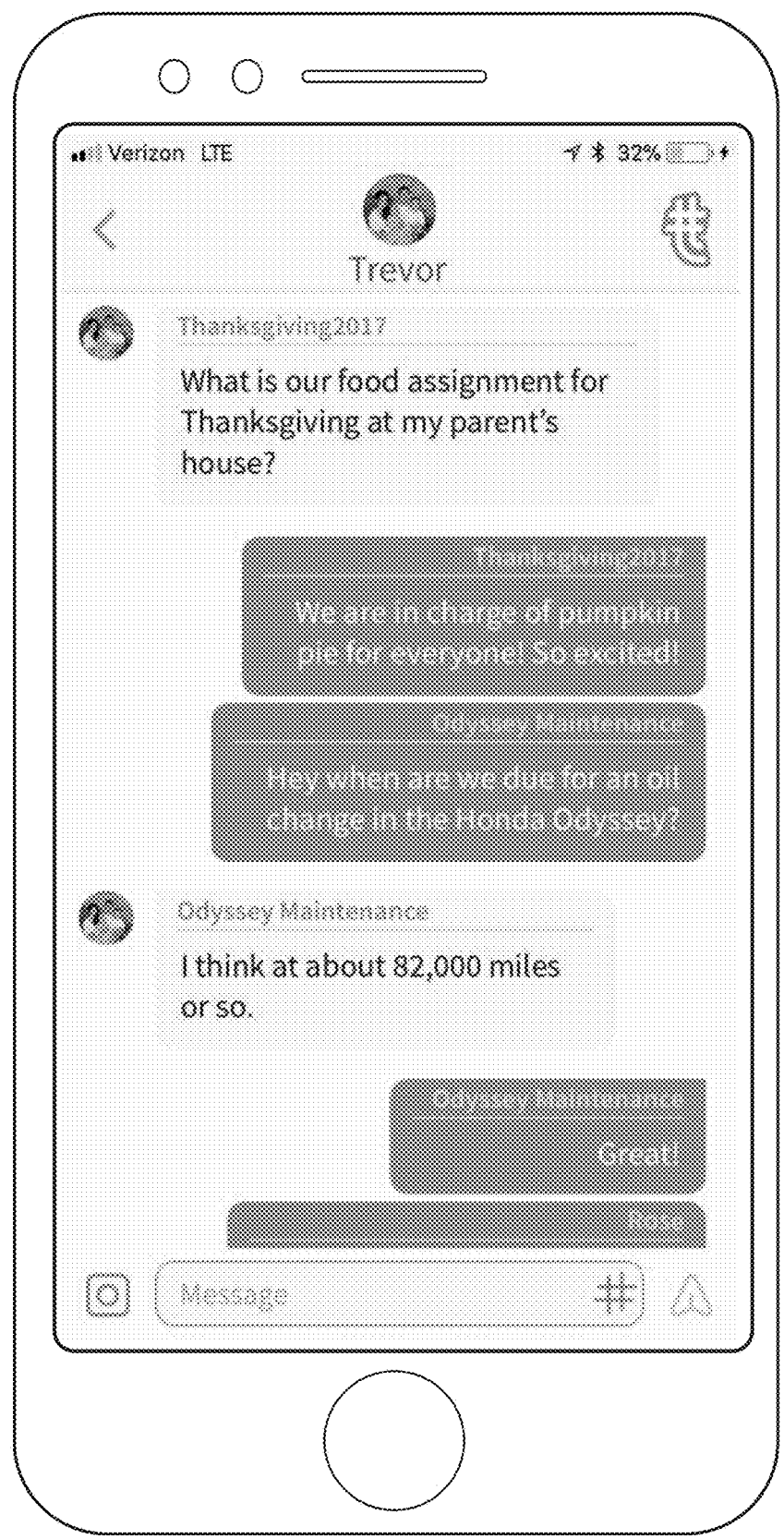
FIG. 3A illustrates another example primary messaging interface at the phone of a user where it may be seen that messages that have been associated with different thread labels may be displayed in the conversation in the same primary messaging interface, in accordance with one or more embodiments of the present disclosure.
Figure 3B:
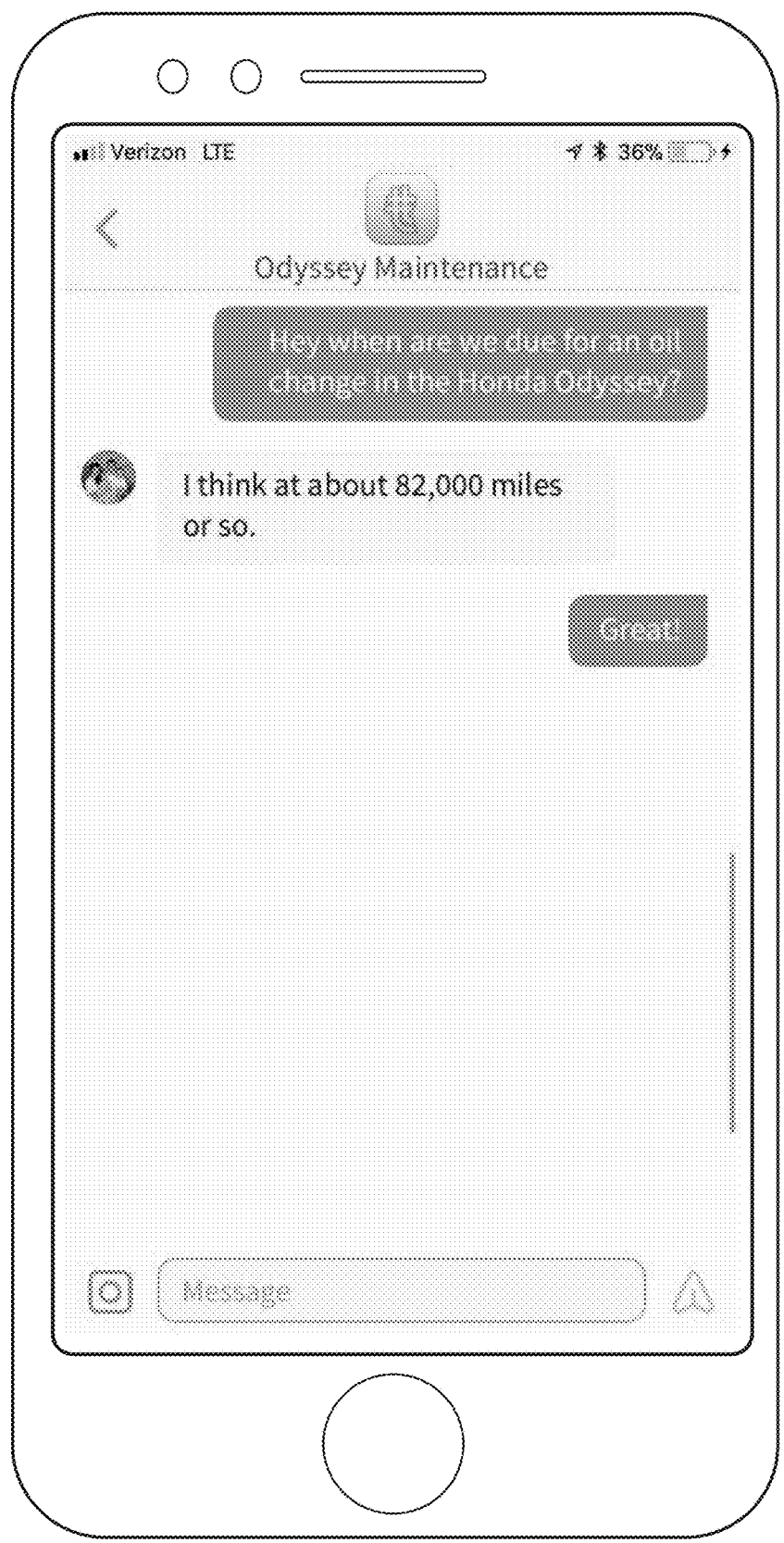
FIG. 3B illustrates another example filtered conversation interface where a user may view messages about a selected topic as filtered from the remaining messages that occurred within the more global messaging conversation between the participant parties, in accordance with one or more embodiments of the present disclosure. As further illustrated, in some embodiments, the filtered conversation interface may be operable as a secondary messaging interface and thus may sometimes be referred to herein as a secondary messaging interface.

FIG. 3A illustrates another example primary messaging interface at the phone of a user (here, at Michaela's phone from the above example) where it may be seen that the conversation pane showing all the messages between the parties to a conversation may include messages associated with different thread labels. As may be seen, the conversation pane shown includes messages associated with the "Thanksgiving2017," "Odyssey Maintenance," and "Rose" thread labels. Even though not shown in FIG. 3A, as noted elsewhere herein, messages that have not been associated with any thread label may also be displayed in the primary messaging interface (e.g., as in the global conversation feed noted above). FIG. 3B illustrates an example secondary messaging interface, similar to that shown in FIG. 2I, where system 1000 may provide a filtered view of the conversation between the parties that pertains to a user selected thread label—here, the "Odyssey Maintenance" thread label.

Figure 4A:
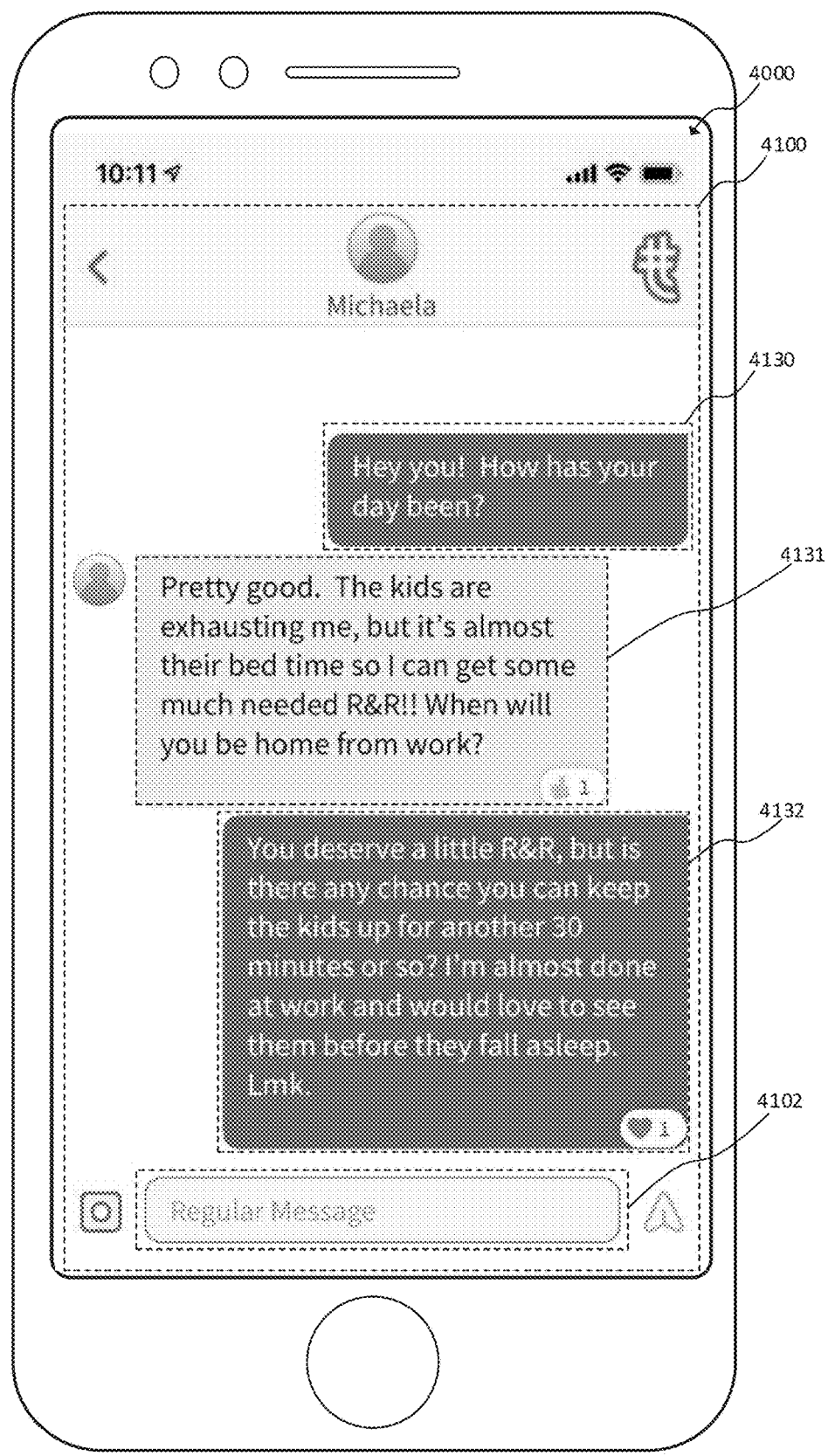
FIG. 4A illustrates an example of a modified primary messaging interface in accordance with one or more embodiments of the present disclosure.

FIG. 4A illustrates an example modified primary messaging interface 4100 shown within a Graphical User Interface (GUI) 4000 of a mobile application running on an example mobile computing device, as may be implemented in accordance with one or more embodiments of the present disclosure. As noted in connection with FIG. 1, in some alternative embodiments messaging component 1041 may be configured to provide a user with an optional modified primary messaging interface, where the modified primary messaging interface provides a quasi-unfiltered view of the messages within a conversation instead of an entirely unfiltered conversation view (as in the primary messaging interface examples discussed above). A quasi-unfiltered view of a conversation with a particular user or group of users may include messages transmitted back-and-forth between the users that have not been associated with a thread label, but excludes the messages that have been associated with a thread label. Quasi-unfiltered refers to the idea that the messages shown in the feed are not filtered in favor of a particular thread label, but instead are filtered to show only those messages with no thread label at all. The modified primary messaging interface may be considered a different operating "mode" of a primary messaging interface. Said differently, the primary messaging interface discussed with reference to FIGS. 1-3B may be considered a first mode (or a "global mode"), and the modified primary messaging interface discussed with reference to FIGS. 4A-4B may be considered a second mode (or a "limited mode").

As shown in FIG. 4A, modified primary messaging interface 4100 may show only those messages that are unthreaded. As such, in some instances a user may need to navigate to a secondary messaging interface associated with a designated thread label to send messages within that thread label. The modified primary messaging interface 4100 may include a message composition zone 4102 wherein a user may compose a regular (i.e., unthreaded) message to one or more recipients by providing input through one or more input tools. Such input tools may include any such input tools discussed with reference to FIGS. 2A-2J, including by way of example, a QWERTY keyboard, a multimedia (e.g., photos, graphics, videos, GIFs etc.) selection tool, a thread label creator, a voice note creation tool, a location sending tool, an audio file attachment tool, a send button, among other tools. When regular messages are sent and received, they appear in the modified primary messaging interface 4100, just as the example messages 4130, 4131, and 4132 shown in FIG. 4A. Note that no threaded messages show up in the conversation feed of the modified primary messaging interface. In this way, the conversation feed is limited, or may be said to be operating in a limited mode. The modified primary messaging interface may operate dynamically, such that messages originally not associated with a thread label but that later become associated with a thread label may be removed from the conversation feed of the modified primary messaging interface.

Figure 4B:
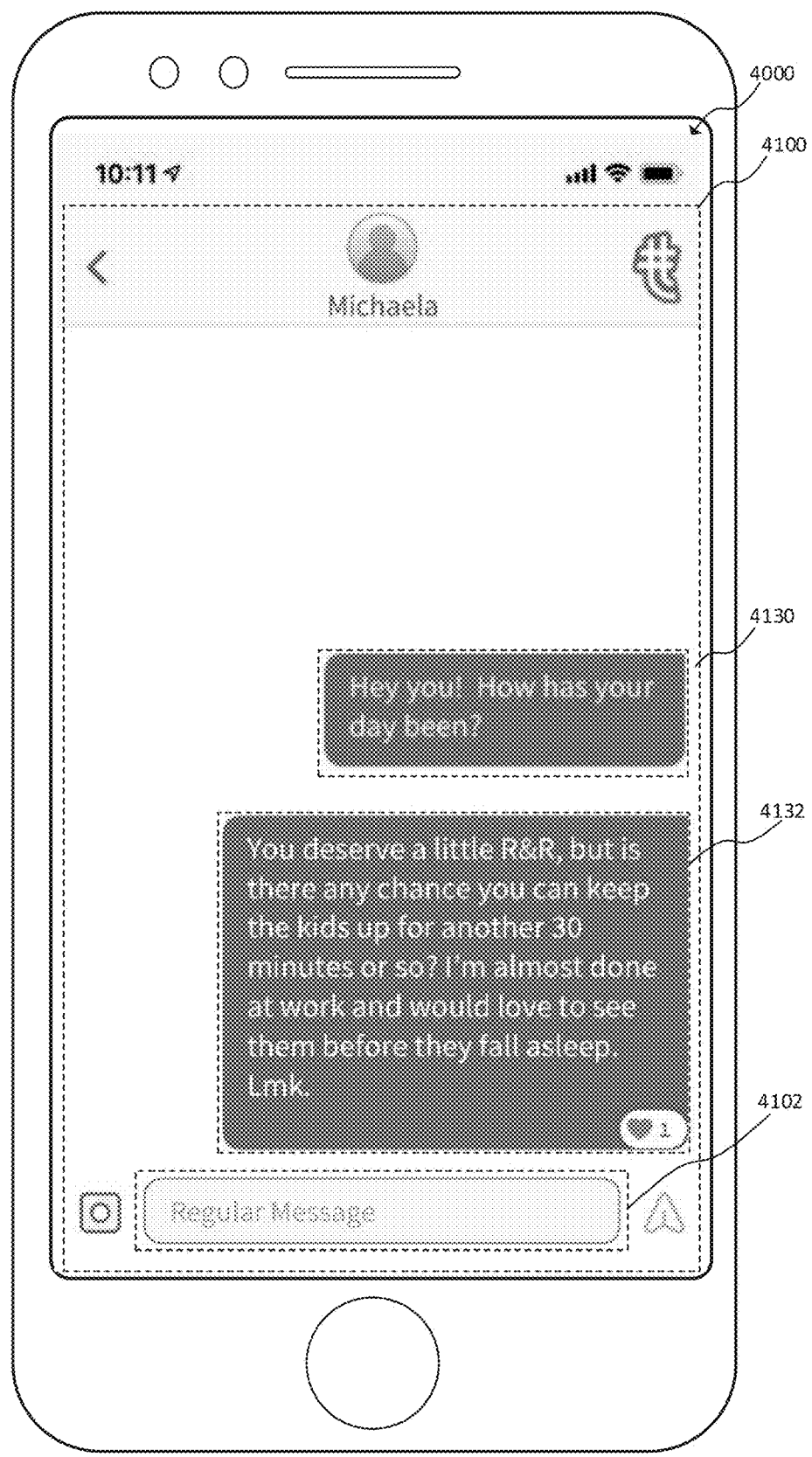
FIG. 4B illustrates a view of the modified primary messaging interface of FIG. 4A after an already transmitted message has been later associated with a thread label.

For example, if after sending message 4131, Michaela associates message 4131 with the "Kids" thread label (introduced above), message 4131 will be automatically removed from the conversation feed of the modified primary messaging interface and moved into a secondary messaging interface that Michaela may access to view only the messages that have been dynamically associated with the "Kids" thread label. FIG. 4B illustrates a view of the modified primary messaging interface 4100 after message 4131 has been associated with a thread label. Note that message 4131 has been removed and only those messages that are unassociated with a thread label appear in the feed (e.g., message 4130, message 4132). Similarly, if after associating a message with a thread label, a user decides to disassociate the message from all thread labels, the message may be repopulated within modified primary messaging interface 4100.

It should be understood that, except as to the global conversation view and the automatic thread label selection features, any of the other features discussed with reference to a primary messaging interface herein may be implemented with respect to a modified primary messaging interface. It should further be appreciated that any of the features discussed herein may be implemented as options at setup, or by default, and/or with alternatives available as options. For example, embodiments of the present disclosure may be provided as a mobile application that is by default set to operate in a limited mode with a modified primary messaging interface (e.g., 4100) instead of a global mode with a standard primary messaging interface (e.g., 2100), or vice versa, with the other option available for selection by the user. In other examples, embodiments of the present disclosure may be provided such that the user may select a limited mode as to conversations with one subset of other users, but a global mode as to conversations with other sets of users. That is, in one embodiment, the mobile application may selectively provide a primary messaging interface, a modified primary messaging interface, and various secondary messaging interfaces, based on a user's preferences.

Figure 5:
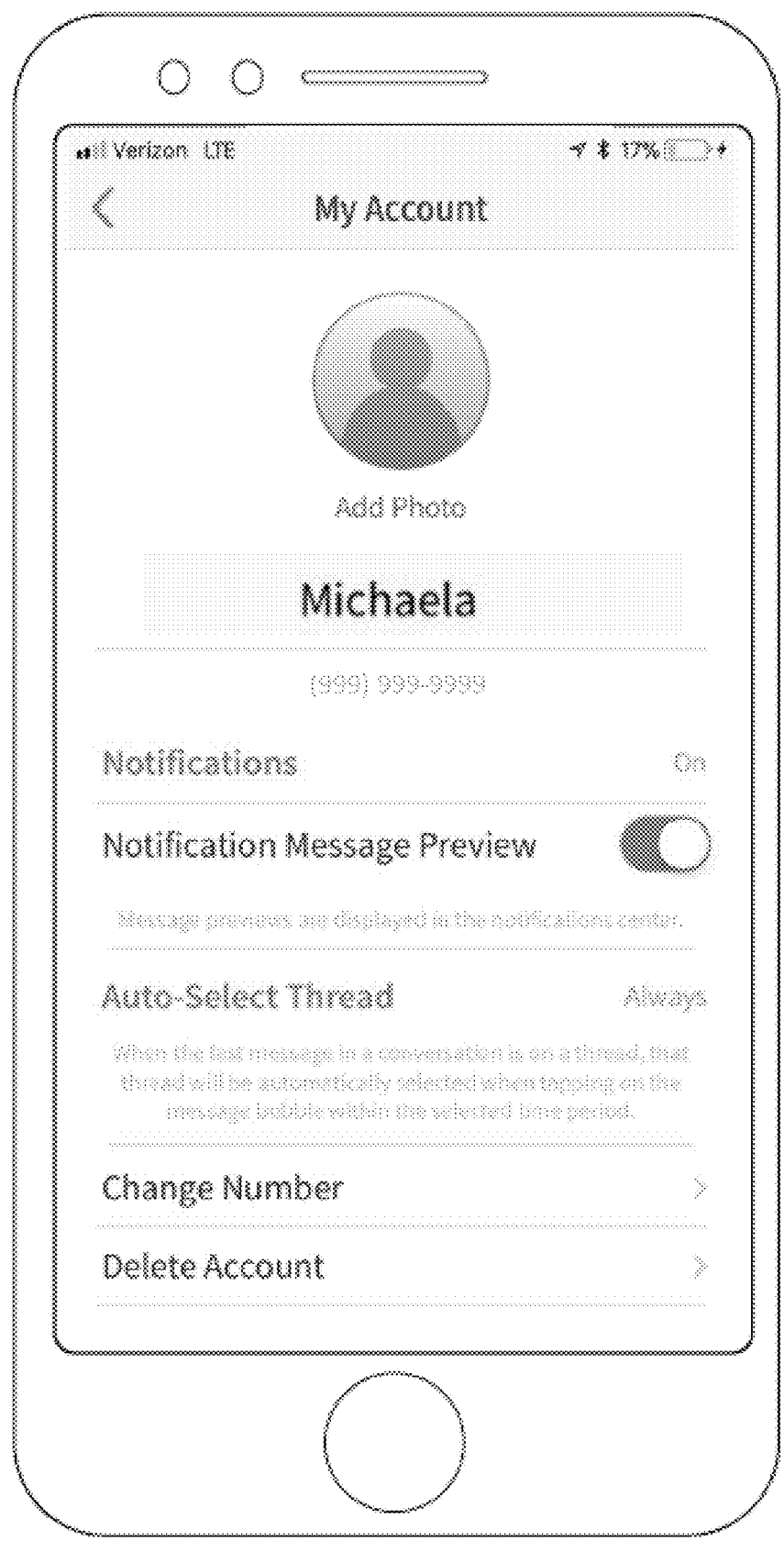
FIG. 5 illustrates an example account setup interface as may be implemented in accordance with one or more embodiments of the present disclosure.

FIG. 5 illustrates an example account profile interface as may be implemented in accordance with one or more embodiments of the present disclosure. As shown, a user may access an account profile interface where the user may change one or more settings prescribing how one or more features of the present disclosure may operate. For example, as shown, a user may turn notifications on or off, notification message previews on or off, thread auto selection on or off, change the phone number associated with his or her account, or delete his or her user account, and/or add a photo to use as a thumbnail. The thread auto selection feature automatically selects the thread label associated with the last message sent or received and associates the same thread label with responsive message(s) sent by the recipient within a predetermined period of time.

Figure 6:
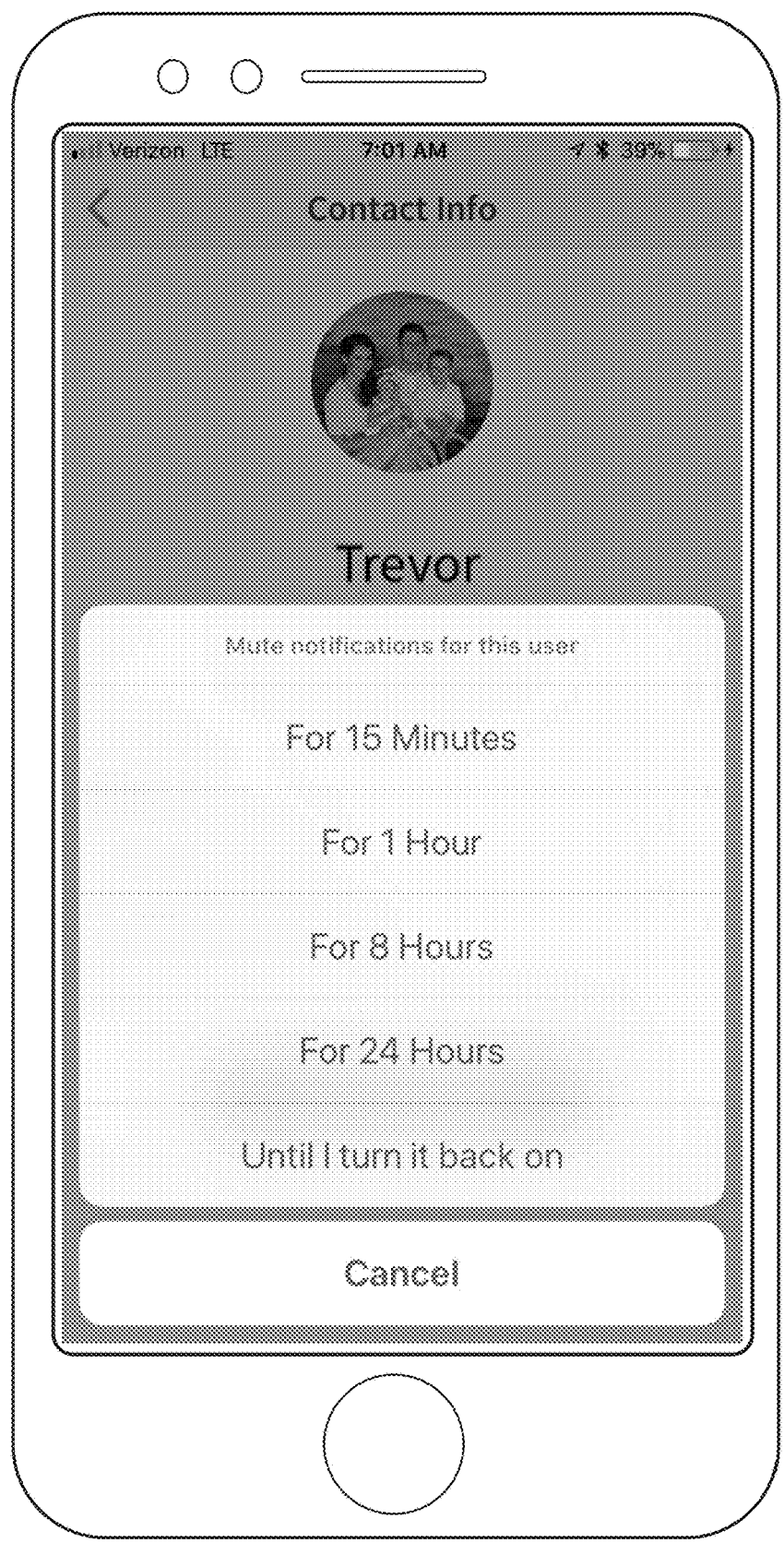
FIG. 6 illustrates an example contact settings interface where a user is given the option to control notifications regarding messages received from a particular contact of the user, as may be implemented in accordance with one or more embodiments of the present disclosure.

In some embodiments, a user may mute notifications for a select period of time for a given user or group, as shown in FIG. 6 (e.g., optional notification muting for messages sent from Michaela's contact, Trevor, for user selectable periods of time). In other words, a user may control notifications regarding messages received from a particular user or group, as may be implemented in accordance with one or more embodiments of the present disclosure.

In some embodiments, a user may mute notifications for a select period of time for any messages received from another user or group that are associated with a particular thread label (e.g., optional notification muting for messages sent from Michaela's contact, Trevor, that are associated with the "Kids" thread label for user selectable periods of time). In other words, a user may control notifications regarding messages received from a particular user or group that are associated with a particular thread label while still receiving notifications for messages received from the user or group that are not associated with that thread label, as may be implemented in accordance with one or more embodiments of the present disclosure.

In some embodiments, a user may mute notifications for a select period of time for any messages received from another user or group that are not associated with any thread label (e.g., optional notification muting for messages sent from Michaela's contact, Trevor, that have not been associated with any thread label for user selectable periods of time). In other words, a user may control notifications regarding messages received from a particular user or group that are not associated with any thread label while still receiving notifications for messages received from the user or group that are associated with one or more thread labels, as may be implemented in accordance with one or more embodiments of the present disclosure.

Figure 7:
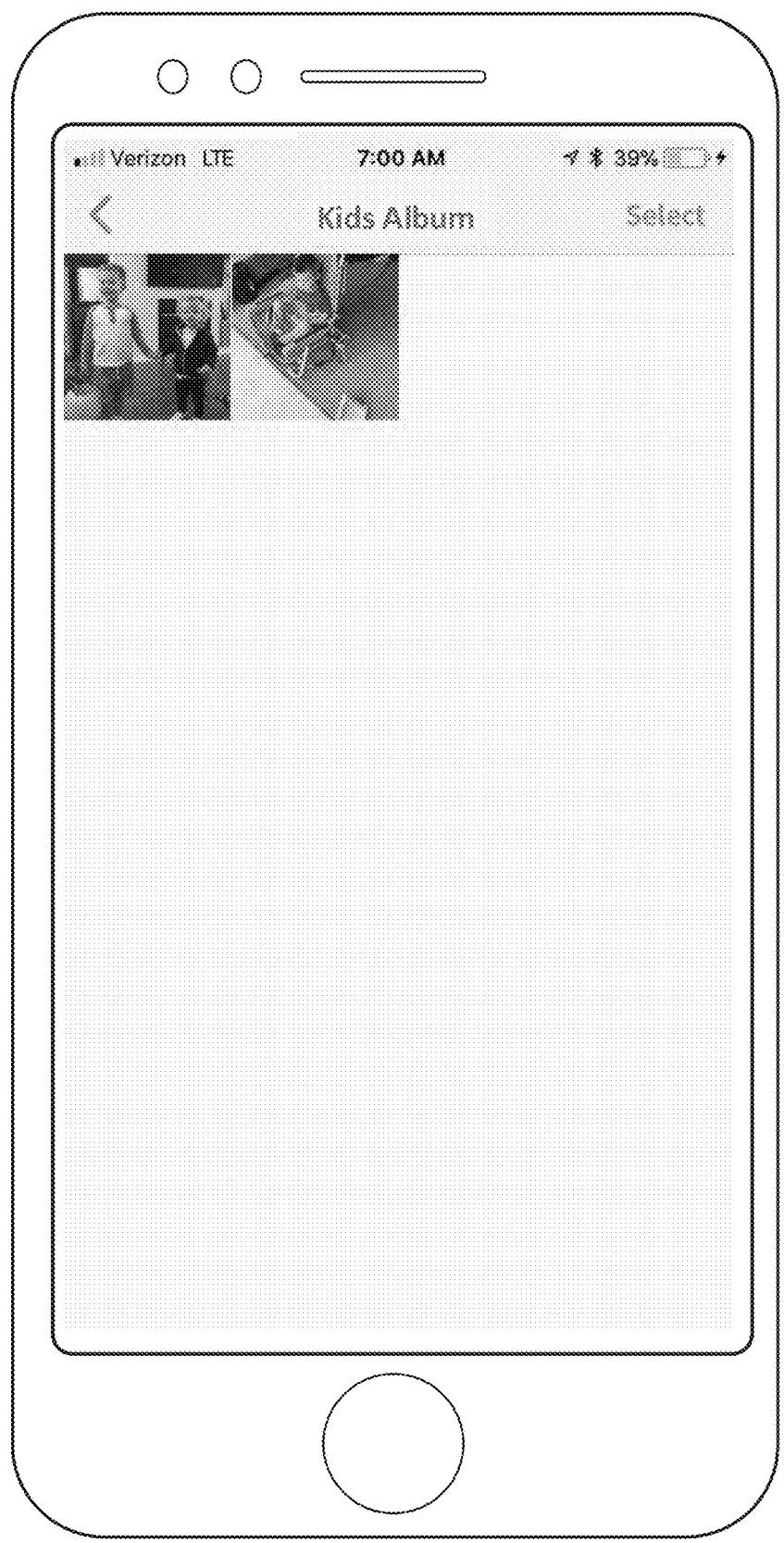
FIG. 7 illustrates an example multimedia filter interface, as may be implemented in accordance with one or more embodiments of the present disclosure.

In some embodiments, filtering component 1043 may be configured to provide a multimedia interface wherein an album of the photos exchanged in a given conversation that are associated with a particular thread label may be displayed. That is, the filtering component 1043 may provide a view that filters out all messages other than those the messages that contain photos that have been exchanged between the participants to a given conversation that have been associated with the particular thread label. FIG. 7 illustrates an exemplary album that may be provided for a given thread label, here for the "Kids" thread label, as may be implemented in accordance with one or more embodiments of the present disclosure.

In some embodiments, messages sent in succession by a user that have all been associated with the same thread label may appear linked (e.g., the message bubbles for each such message could be touching, rather than being separated) with only the message first sent in the series including the thread label. The linked appearance of the messages in such a series of messages may inform the users to the conversation that all of those messages have been associated with that particular thread label without having to repeat the thread label for each message in such series.

Figure 8:
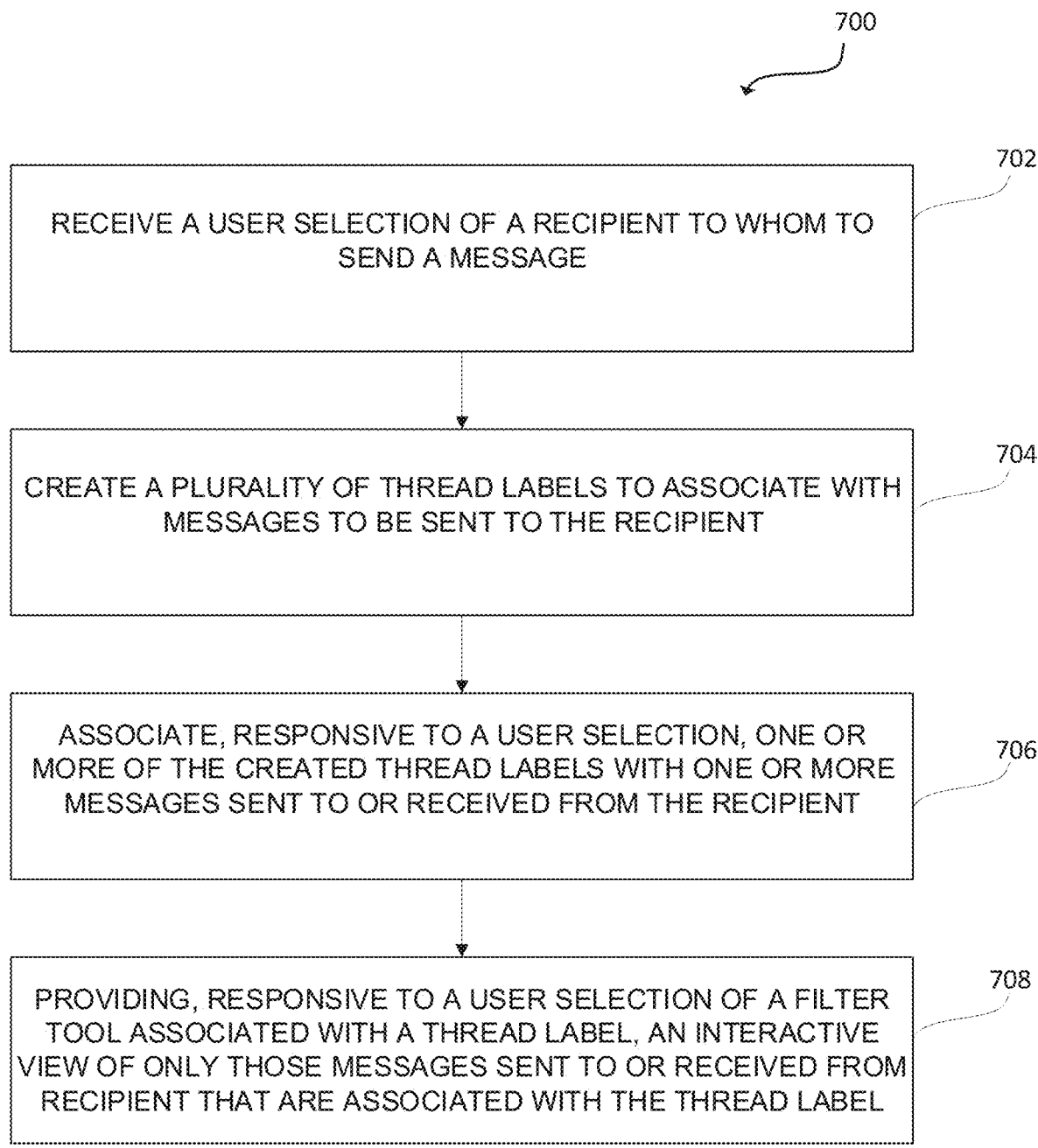
FIG. 8 illustrates an example method that may be implemented in accordance with one or more embodiments of the present disclosure.

FIG. 8 illustrates an example method 700 that may be implemented in accordance with one or more embodiments of the present disclosure. As shown, at operation 702, method 700 may include receiving a user selection of a recipient to whom to send a message. At operation 704, method 700 may include creating a plurality of thread labels to associate with messages to be sent to the recipient. At operation 706, method 700 may include associating, responsive to user selection, one or more of the created thread labels with one or more messages sent to or received from the recipient. At operation 708, method 700 may include providing, responsive to a user selection of a filter tool associated with a thread label, an interactive view of only those messages sent to or received from recipient that are associated with the thread label.

Figure 9:
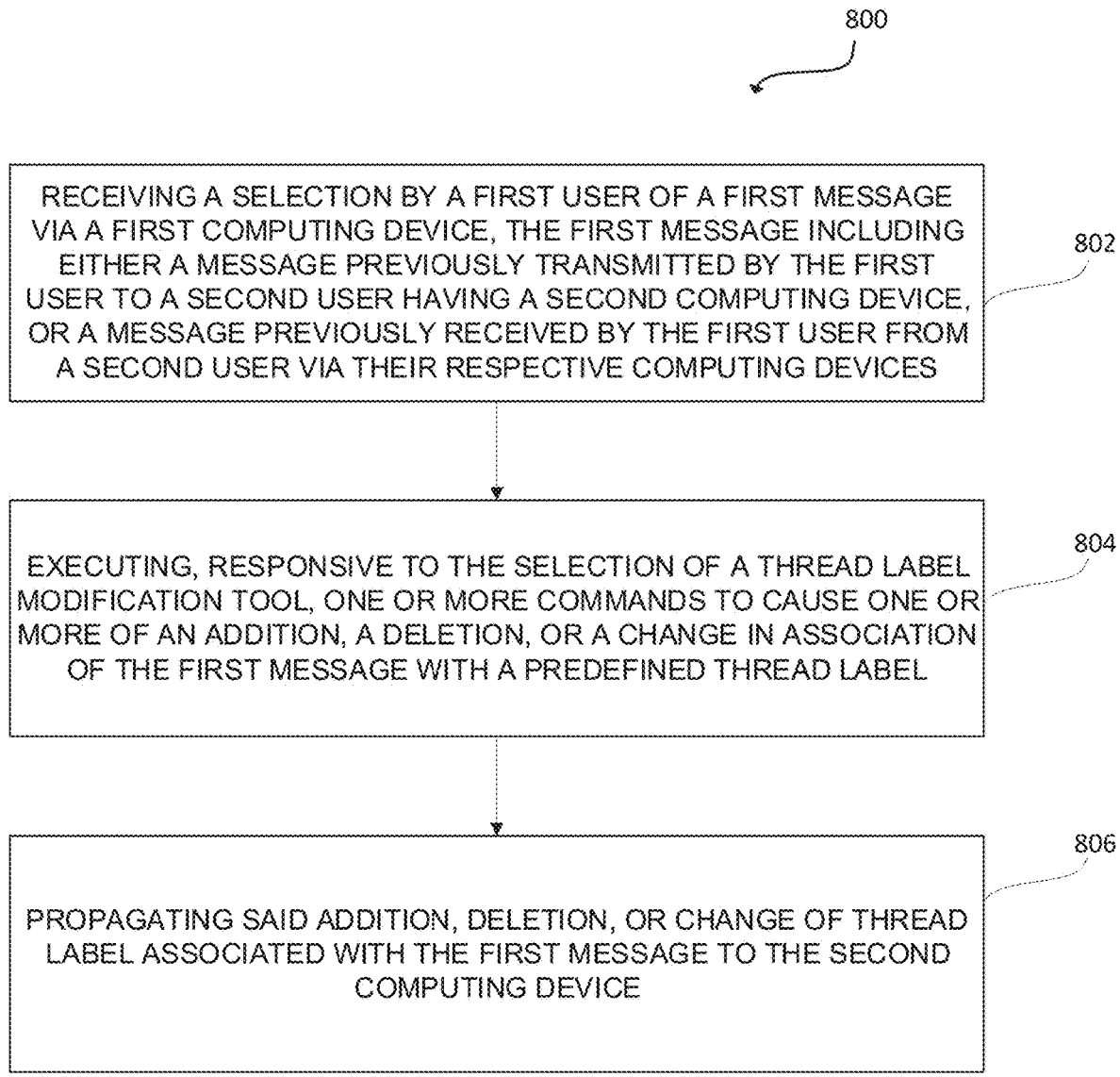
FIG. 9 illustrates another example method that may be implemented in accordance with one or more embodiments of the present disclosure.

FIG. 9 illustrates an example method 800 that may be implemented in accordance with one or more embodiments of the present disclosure. As shown, at operation 802, method 800 may include receiving a selection by a first user of a first message via a first computing device, the first message including either a message previously transmitted by the first user to a second user having a second computing device, or a message previously received by the first user from a second user via their respective computing devices. At operation 804, method 800 may include executing, responsive to the selection of a thread label modification tool, one or more commands to cause one or more of an addition, a deletion, or a change in association of the first message with a predefined thread label. At operation 806, method 800 may include propagating said addition, deletion, or change of thread label associated with the first message to the second computing device.

While some embodiments above are discussed in relation to messaging applications, the technology can be applied similarly to other platforms, such as note taking. In an example note taking embodiment, a note taker may be able to label some notes in a document using a first thread label, while labeling other notes on the same document using a second thread label. A note taker may thus be able to associate, de-associate, and re-associate the notes with thread labels. These thread labels, and the associated notes, may be shareable to other users. Other details discussed above would be applied equally in this context.

Figure 10:
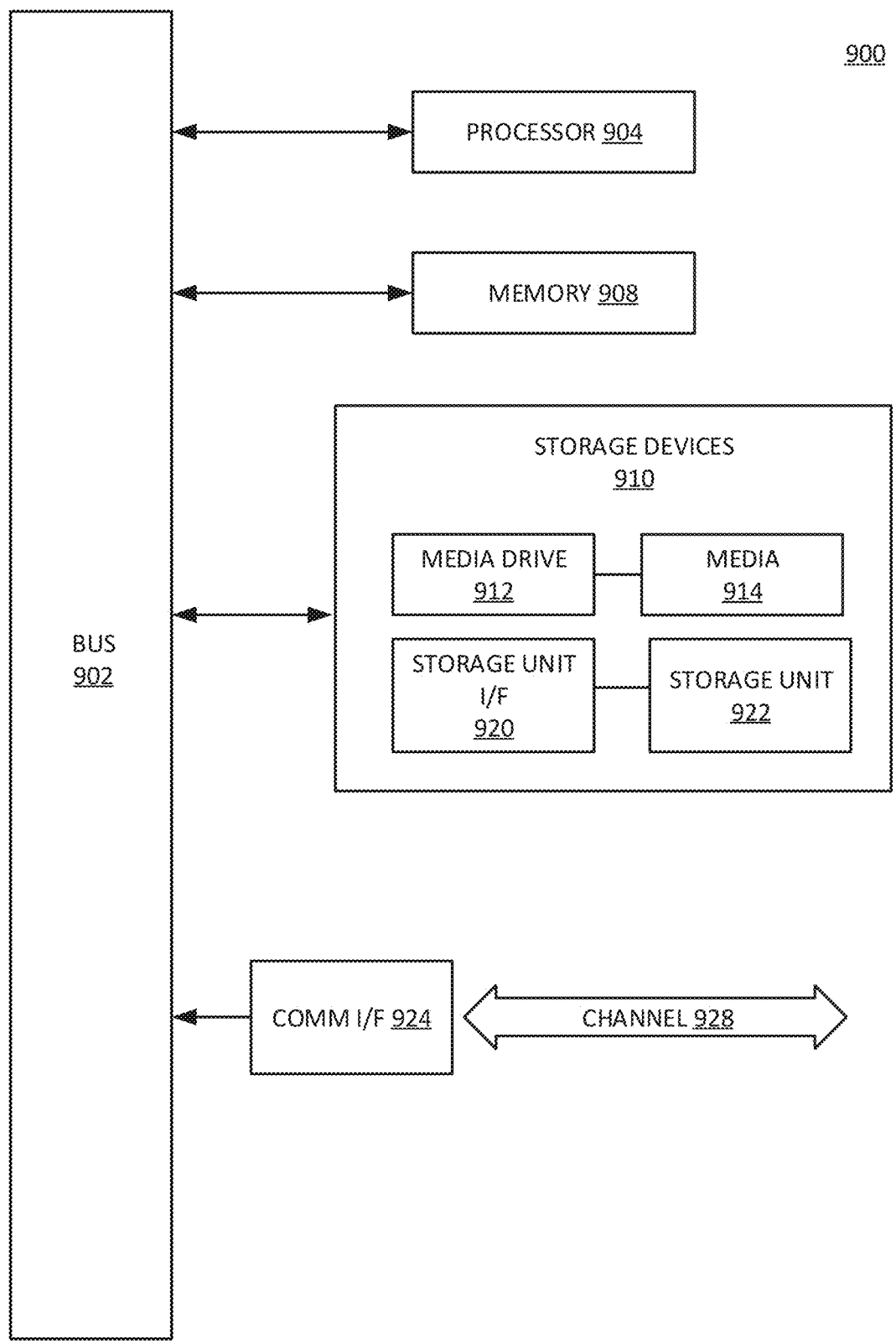
FIG. 10 illustrates an example computing component that may be used in implementing various features of embodiments of the disclosed technology.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the technology are implemented in whole or in part using software, in one embodiment, these software elements can be implemented to operate with a computing or processing component capable of carrying out the functionality described with respect thereto. One such example computing component is shown in FIG. 10. Various embodiments are described in terms of this example computing component 900. After reading this description, it will become apparent to a person skilled in the relevant art how to implement the technology using other computing components or architectures.

Referring now to FIG. 10, computing component 900 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 900 might include, for example, one or more processors, controllers, control modules, or other processing devices, such as a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing component 900 or to communicate externally.

Computing component 900 might also include one or more memory modules, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage device 910, which might include, for example, a media drive 912 and a storage unit interface 920. The media drive 912 might include a drive or other mechanism to support fixed or removable storage media 914. For example, a hard disk drive, a floppy disk drive, a magnetic tape drive, an optical disk drive, a CD or DVD drive (R or RW), or other removable or fixed media drive might be provided. Accordingly, storage media 914 might include, for example, a hard disk, a floppy disk, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage device 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory module) and memory slot, a PCMCIA slot and card, and other fixed or removable storage units 922 and interfaces 920 that allow software and data to be transferred from the storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

For example, any of the interfaces described in any of the above-described exemplary embodiments may be referred to using different names or terminology, such as a first messaging interface, second messaging interface, first interface, second interface, etc. It should also be understood that when such interfaces are referred to with "first," "second," etc. designations, unless stated otherwise such interfaces need not be presented for display in such an order. That is, when referring to a "first messaging interface" and a "second messaging interface," the same should not be understood to be limited to embodiments where the "first messaging interface" must be displayed on a GUI first, or that the "second messaging interface" must be displayed on a GUI second, for example.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the term "topic" should be construed broadly.

The terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various constituents of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

We claim:

1. A system, comprising:
   one or more processors;

a memory storing instructions that, when executed by the one or more processors, cause the system to:
provide, responsive to a first selection on a first device, a first messaging interface for electronic messaging, the first messaging interface comprising a message composition zone and a conversation pane configured to present a conversation feed;
wherein the conversation feed of the first messaging interface includes each of the one or more electronic messages that have not been associated with any thread label by a user or a recipient; and
wherein the conversation feed of the first messaging interface excludes each of the one or more electronic messages that have been associated with any thread label by the user or the recipient;
provide, from within the first messaging interface, an option to associate a thread label with one or more electronic messages displayed within the first messaging interface;
associate, responsive to a selection of the option by the user from within the first messaging interface, the thread label with one or more electronic messages of the plurality of electronic messages displayed within the first messaging interface;
provide, responsive to a second selection on the first device, a second messaging interface for electronic messaging, the second messaging interface comprising: a message composition zone, and a conversation pane configured to present a conversation feed;
wherein the conversation feed of the second messaging interface includes each of the one or more electronic messages associated with the thread label by either the user or the recipient; and
wherein the conversation feed of the second messaging interface excludes electronic messages of the plurality of messages not associated with the thread label;
associate, responsive to an electronic message being provided for transmission by the user or the recipient from within the second messaging interface, the thread label corresponding to the second messaging interface with the electronic message;
provide, from within the second messaging interface, an option to disassociate the thread label from one or more electronic messages of the plurality of electronic messages previously associated with the thread label;
disassociate, responsive to a selection of the option by the user from within the second messaging interface, the thread label from one or more electronic messages of the plurality of electronic messages previously associated with the thread label;
monitor the plurality of electronic messages to detect post-transmission thread label association changes and thread label disassociation changes made by one or more of the user and the recipient; and
propagate, responsive to detecting a thread label association or disassociation change to an electronic message made by one of the user and the recipient, the thread label association or disassociation change to the other of the user and the recipient such that the thread label association or disassociation change is reflected in the first and second messaging interfaces of the first device and in a messaging interface provided on a second device used by the recipient.

2. The system of claim 1, wherein the memory further stores instructions that, when executed by the one or more processors, cause the system to:
provide, within the first messaging interface, a selectable display object corresponding to the thread label.

3. The system of claim 2, wherein the memory further stores instructions that, when executed by the one or more processors, cause the system to:
navigate, responsive to a selection by the user of the selectable display object, from the first messaging interface to the second messaging interface.

4. The system of claim 2, wherein the memory further stores instructions that, when executed by the one or more processors, cause the system to:
position the selectable display object within the first messaging interface based on one or more of:
a number of unread electronic messages associated with the thread label corresponding to the selectable display object; and
a measure of recent electronic messaging activity associated with the thread label corresponding to the selectable display object.

5. The system of claim 2, wherein the selectable display object is a thumbnail comprising imagery associated with the thread label.

6. The system of claim 5, wherein the thumbnail imagery of the selectable display object is modifiable by a user.

7. The system of claim 1, wherein the one or more electronic messages comprises one or more of an image, a video and a GIF; and wherein the memory further stores instructions that, when executed by the one or more processors, cause the system to:
add, responsive to the association, the one or more of the image, the video and the GIF into a thread label album provided on the first device, wherein the thread label album corresponds to a collection of images, videos and GIFs contained within messages associated with the thread label; and
propagate, responsive to the association, the addition of the one or more of the image, the video and the GIF into a thread label album provided on the second device used by the recipient.

8. The system of claim 7, wherein the memory further stores instructions that, when executed by the one or more processors, cause the system to:
remove, responsive to a disassociation of the thread label from the electronic message, the one or more of the image, the video and the GIF from the thread label associated album; and
propagate, responsive to the disassociation, the removal of the one or more of the image, the video and the GIF from a thread label album provided on the second device used by the recipient.

9. A method, comprising:
providing, responsive to a first selection on a first device, a first messaging interface for electronic messaging, the first messaging interface comprising a message composition zone and a conversation pane configured to present a conversation feed;
wherein the conversation feed of the first messaging interface includes each of the one or more electronic messages that have not been associated with any thread label by a user or a recipient; and
wherein the conversation feed of the first messaging interface excludes each of the one or more electronic messages that have been associated with any thread label by the user or the recipient;

providing, from within the first messaging interface, an option to associate a thread label with one or more electronic messages displayed within the first messaging interface;

associating, responsive to a selection of the option by the user from within the first messaging interface, the thread label with one or more electronic messages of the plurality of electronic messages displayed within the first messaging interface;

providing, responsive to a second selection on the first device, a second messaging interface for electronic messaging, the second messaging interface comprising: a message composition zone, and a conversation pane configured to present a conversation feed;

wherein the conversation feed of the second messaging interface includes each of the one or more electronic messages associated with the thread label by either the user or the recipient; and wherein the conversation feed of the second messaging interface excludes electronic messages of the plurality of messages not associated with the thread label;

associating, responsive to an electronic message being provided for transmission by the user or the recipient from within the second messaging interface, the thread label corresponding to the second messaging interface with the electronic message;

providing, from within the second messaging interface, an option to disassociate the thread label from one or more electronic messages of the plurality of electronic messages previously associated with the thread label;

disassociating, responsive to a selection of the option by the user from within the second messaging interface, the thread label from one or more electronic messages of the plurality of electronic messages previously associated with the thread label;

monitoring the plurality of electronic messages to detect post-transmission thread label association changes and thread label disassociation changes made by one or more of the user and the recipient; and propagating, responsive to detecting a thread label association or disassociation change to an electronic message made by one of the user and the recipient, the thread label association or disassociation change to the other of the user and the recipient such that the thread label association or disassociation change is reflected in the first and second messaging interfaces of the first device and in a messaging interface provided on a second device used by the recipient.

10. The method of claim 9, further comprising:
providing, within the first messaging interface, a selectable display object corresponding to the thread label.

11. The method of claim 10, further comprising:
navigating, responsive to a selection by the user of the selectable display object, from the first messaging interface to the second messaging interface.

12. The method of claim 10, further comprising:
positioning the selectable display object within the first messaging interface based on one or more of:
a number of unread electronic messages associated with the thread label corresponding to the selectable display object; and
a measure of recent electronic messaging activity associated with the thread label corresponding to the selectable display object.

13. The method of claim 10, wherein the selectable display object is a thumbnail comprising imagery associated with the thread label.

14. The method of claim 9, wherein the one or more electronic messages comprises one or more of an image, a video and a GIF; and wherein the method further comprises:
adding, responsive to the association, the one or more of the image, the video and the GIF into a thread label album provided on the first device, wherein the thread label album corresponds to a collection of images, videos and GIFs contained within messages associated with the thread label; and
propagating, responsive to the association, the addition of the one or more of the image, the video and the GIF into a thread label album provided on the second device used by the recipient.

15. The method of claim 14, further comprising:
removing, responsive to a disassociation of the thread label from the electronic message, the one or more of the image, the video and the GIF from the thread label associated album; and
propagating, responsive to the disassociation, the removal of the one or more of the image, the video and the GIF from a thread label album provided on the second device used by the recipient.

* * * * *